US012797273B2

(12) United States Patent
Journet

(10) Patent No.: US 12,797,273 B2
(45) Date of Patent: Nov. 17, 2026

(54) PERSON-MOVING DEVICE COMPRISING A TILTABLE TWO-LOOP HARNESS

(71) Applicant: Christophe Journet, Montpellier (FR)

(72) Inventor: Christophe Journet, Montpellier (FR)

( * ) Notice: Subject to any disclaimer, the term of this patent is extended or adjusted under 35 U.S.C. 154(b) by 376 days.

(21) Appl. No.: 18/252,664

(22) PCT Filed: Nov. 19, 2021

(86) PCT No.: PCT/EP2021/082243
§ 371 (c)(1),
(2) Date: Oct. 15, 2024

(87) PCT Pub. No.: WO2022/106591
PCT Pub. Date: May 27, 2022

(65) Prior Publication Data

US 2025/0017796 A1 Jan. 16, 2025

(30) Foreign Application Priority Data

Nov. 21, 2020 (FR) ....................................... 2011971

(51) Int. Cl.
*A61G 7/10* (2006.01)

(52) U.S. Cl.
CPC ......... *A61G 7/1051* (2013.01); *A61G 7/1017* (2013.01); *A61G 7/1042* (2013.01); *A61G 7/1088* (2013.01); *A61G 7/109* (2013.01)

(58) Field of Classification Search
CPC .. A61G 7/1051; A61G 7/1017; A61G 7/1042; A61G 7/1088; A61G 7/109; A61G 2200/32; A61G 2200/34; A61G 7/1061; A61G 7/1065; A61G 7/1015; A61G 7/10; A63G 9/02
See application file for complete search history.

(56) References Cited

U.S. PATENT DOCUMENTS 1,709,153 A * 4/1929 Pownall .................... A61F 5/04
601/24
3,123,224 A * 3/1964 Kral ..................... A61G 7/1019
5/81.1 R (Continued)

FOREIGN PATENT DOCUMENTS

| | | | | | |
|---|---|---|---|---|---|
| EP | 1145699 | A1 | | 10/2001 | |
| FR | 2568470 | A1 | * | 2/1986 | ........... A61G 7/1042 |
| WO | 9633687 | A1 | | 10/1996 | |

*Primary Examiner* — Aaron R Eastman
(74) *Attorney, Agent, or Firm* — PatShegen IP; Moshe Pinchas

(57) ABSTRACT

The person transfer device comprises:
- a means for suspension (105) from a ceiling rail, arm or lifting module;
- a prehension device (101) comprising a first lateral drive system comprising at least two rollers (102) of which at least one is motorised, and a second lateral drive system comprising at least two rollers (102) of which at least one is motorised; and
- a person transport harness (117) comprising a first large sling loop (120) supported by the first drive system, and a second large sling loop (120) supported by the second drive system;
- and wherein the friction of the drive systems against the surface of the sling loops results in the rotation of at least one portion of the harness,
- such that the person transfer device allows a person (121) installed in the harness to be tilted according to at least two predefined positions.

11 Claims, 20 Drawing Sheets

(56) References Cited

U.S. PATENT DOCUMENTS

| | | | | | |
|---|---|---|---|---|---|
| 4,138,750 | A | | 2/1979 | Michalowski | |
| 4,243,147 | A | * | 1/1981 | Twitchell | A61G 7/1042 212/327 |
| 4,530,122 | A | * | 7/1985 | Sanders | A61G 7/1015 5/81.1 R |
| 4,627,119 | A | * | 12/1986 | Hachey | A61G 7/1015 5/85.1 |
| 6,049,923 | A | * | 4/2000 | Ochiai | A61G 7/1055 5/85.1 |
| 10,610,432 | B1 | * | 4/2020 | Justice | A61G 7/1074 |
| 2012/0318587 | A1 | * | 12/2012 | Alghazi | A61H 3/04 135/66 |
| 2014/0138995 | A1 | * | 5/2014 | Leib | A61H 3/008 297/283.2 |
| 2015/0272801 | A1 | * | 10/2015 | Karlsson | A61G 7/1069 294/81.1 |
| 2020/0085659 | A1 | * | 3/2020 | Tari | B66C 15/00 |
| 2020/0230005 | A1 | * | 7/2020 | Hidler | A61G 7/1042 |
| 2020/0312452 | A1 | * | 10/2020 | Durlach | G16H 40/67 |
| 2020/0345569 | A1 | * | 11/2020 | Paramonov | A61G 7/1015 |
| 2022/0104979 | A1 | * | 4/2022 | Soreefan | A61G 7/002 |
| 2024/0261162 | A1 | * | 8/2024 | Pannucci | A61G 7/1019 |

* cited by examiner

PERSON-MOVING DEVICE COMPRISING A TILTABLE TWO-LOOP HARNESS

TECHNICAL FIELD OF THE INVENTION

The present invention relates to a suspended person transfer device operating a tiltable harness. The person transfer device according to the invention is especially suitable for transporting people with a total or partial motor function dependency over short distances.

STATE OF THE ART

Devices for the medical transfer of persons usually comprise a hook suspended from a ceiling rail or from a mobile person-lift arm supporting a prehension bar comprising a plurality of attachment areas which, in their turn, support a harness. The harness comprises a plurality of straps, also called slings, attached at points distributed over the harness. For example, two straps are attached on one side of the harness corresponding to a leg portion intended to support the lower limbs, and two straps are attached to a back or headrest portion intended to support the torso and the upper limbs. Each of the straps is attached to a dedicated hook provided on the prehension bar, for example a hook.

To enable the medical transfer in a seated position or lying position with the same prehension bar, the prior art knows harnesses whose straps comprise a plurality of small loops distributed over their length. The health-care personnel or caregiver operating the harness can therefore choose to extend the straps supporting the leg portion by attaching the loops of these straps that are farthest from the harness to the hooks of the prehension bar, to make the harness adopt a seated position. Conversely, all the straps of the harness can be adjusted to the same length to transport a person in a lying position.

This system does not allow the position of the harness to be altered during an operation transferring a person. In addition, this system does not make it possible to achieve a specific tilt for correctly establishing a person on all types of seats. This means that the health-care personnel or caregiver need to push or manually lift the person transported so that the person's buttocks are well positioned on the seat of the chair.

A solution to allow the position of the harness to be altered during an operation transferring a person consist of implementing an electrical mobile suspension device. An electrical mobile suspension device is a rigid tubular chassis that comprises the points of attachment to the harness. The rigid chassis is connected by a hinge link to a metal frame positioned vertically. As needed, the extension of an electric actuator articulating the chassis with the frame makes it possible to switch the chassis from a substantially horizontal position corresponding a lying position to a substantially vertical position corresponding to a seated position.

One drawback of electrical mobile suspension devices is that they are large, bulky and sometimes intimidating for the person transported, who is enveloped by the tubular metal chassis. In addition, for the health-care personnel or caregiver, operating lifting devices that comprise an electrical mobile suspension device is not easy as this suspension sways during the movement. In addition, the repeated operation of electric mobile suspension devices causes musculo-skeletal problems because of their significant weight. Lastly, electrical mobile suspension devices can only be installed on fixed ceiling motors or on wheeled mobile person-lifts mobiles, and are not compatible with detachable mobile motors. The detachable mobile motors are compact modules for lifting a person, which can be easily transported from one room to another on a trolley, designed to be connected to a ceiling rail along which they move.

In addition, systems are known such as those described in patent applications WO 96/33687, US 2015/272801 and U.S. Pat. No. 4,627,119. However, such systems do not make it possible to overcome the limitations mentioned above.

DESCRIPTION OF THE INVENTION

The present invention aims to remedy all or part of these drawbacks.

According to a first aspect, the invention envisions a person transfer device that comprises:

- a means for suspension from a ceiling rail, arm or lifting module;
- a prehension device comprising a first lateral drive system comprising at least two rollers of which at least one is motorised, and a second lateral drive system comprising at least two rollers of which at least one is motorised; and
- a person transport harness comprising a first large sling loop supported by the first drive system, and a second large sling loop supported by the second drive system;
- and wherein the friction of the drive systems against the surface of the sling loops results in the rotation of at least one portion of the harness, such that the person transfer device allows a person installed in the harness to be tilted according to at least two predefined positions.

The prehension device of the invention allows the harness to be tilted between several positions, in particular between a lying position and a seated position. In contrast to the prehension devices of the prior state of the art, the tilt can be altered during the person transfer operation, i.e. without needing to remove the person transported from the device to adjust or rearrange the fastenings of the slings. According to the invention the two sling loops, each attached to the harness at two attachment points, are each suspended from two rollers belonging to a lateral drive system. The rotation of the drive systems against the slings causes, by friction, the movement of the sling and therefore the tilting of the harness. The weight of the harness and of the person is supported by the slings that are, in their turn, supported by the rollers.

The large sling loops supported by the rollers or by the belt replace the attachment systems of the prior state of the art comprising four sling attachments fixed to hooks. These provisions enable a simpler operation for assembling slings on the device, great stability of the harness supported at four points by the four rollers, and a large range of the possible tilt positions of the harness, while providing a simple mechanical structure that can reduce the production costs of the device and its dimensions. In addition, as the sling loops are supported by gravity on the rollers, the frictional force between the rollers and the sling loops is increased when the harness is weighed down by the weight of a person to be transported, thereby offering greater stability. Conversely, the frictional force is lessened when the weight of the person to be transported is resting on a bed or chair, making it easier for the sling loops to be mounted on and removed from the device.

In addition, the person transfer device comprises neither a large metal chassis nor a frame that are directly located next to the person, and therefore are likely to be intimidating for the person transported. On the contrary, only the sling loops are present on either side of the person transported, offering a lighter overhead construction. In addition, the person transfer device comprises a light harness that has with no metal frames and is consequently flexible and compact after folding. The compactness of the person transfer device that is the subject of the invention and of its harness make it especially suitable for a mobile use on ceiling rails.

In the present description, the term “sling” means a rope, cable, band, strap, or any other equivalent means attached to the harness, the largest portion of its length forming a large loop that goes round the assembly formed by at least two rollers, or the assembly formed by a belt going round at least two rollers, of a lateral drive system.

Note that, in the present description, the adjective “large” in “large loop” is used to emphasise that it is the largest length of the sling that forms a loop, in contrast to the solutions of the prior state of the art, which proposes straight slings, sometimes equipped on their ends with small loops intended to be attached to hook-type attachment points.

It is noted at this stage that, in the present description, the term “double-loop harness” refers to a harness comprising two slings, arranged in the form of a loop, each being configured to be suspended, for example from a lateral drive system.

In some embodiments, the large loop slings are supported directly by the rollers of the lateral drive systems.

In some embodiments, each lateral drive system comprises a belt going round the rollers of this lateral drive system, and the large sling loops are each supported by the belt of a lateral drive system.

Thanks to these provisions, the implementation of a belt at the interface of the rollers and the large sling loops ensures a larger contact surface between the large sling loops and their support. In this way, the coefficient of friction between the large sling loops and their support is increased compared to the direct friction between the rollers alone and the large sling loops. These provisions reduce the risk of the large sling loops slipping, and increase the stability of the harness during the operation of the person transfer device that is the subject of the invention.

In some embodiments, the first and second lateral drive systems can be actuated simultaneously and independently.

Thanks to these provisions, the tilting of the two parts of the double-loop harness can be adjusted separately by actuating the rollers of the first and second lateral drive systems independently. The asymmetric tilting of the harness is useful in compensating for certain specific handicaps.

In some embodiments, two rollers, referred to as the “front roller” and “rear roller”, of a lateral drive system are each mounted on a support moveable in rotation which comprises an actuator configured to vary the distance between these front and rear rollers.

Thanks to these provisions, the front rollers supporting a leg portion of the harness can be moved apart from the rear rollers supporting the back/headrest portion of the harness. For example, a configuration with a maximum spacing will be suitable for larger-sized people and the position of the people to be transported is more comfortable in a lying position. Conversely, a minimum spacing will be suitable for smaller-sized people, and the people are better positioned in a seated position. This roller spacing option makes it possible, for example, for a “seated/lying” transfer to receive a person on a chair in a minimum spacing configuration and configure into a maximum spacing during the transfer while tilting the harness into a lying position in order to provide optimal comfort for the person transported.

In some embodiments, the person transfer device comprises a first support of two rollers, referred to as the “front support”, and a second support of two rollers, referred to as the “rear support”, and the spacing distance between the rollers of the front support is smaller than the spacing distance between the rollers of the rear support, such that two axes, each traced between one roller of the front support and one roller of the rear support, are not parallel to each other and intersect in a “V” next to the front support.

Thanks to these provisions, the spacing between the rollers of the front support supporting the leg portion of the harness is smaller than the spacing between the rollers of the rear support supporting the back/headrest portion of the harness. These provisions allow a more comfortable and more stable seat.

In some embodiments, a first roller is mounted on a first support, referred to as the “front support”, mobile in translation along a slot relative to a second roller mounted on a second support, referred to as the “rear support”, the first and second rollers belonging to the same lateral drive system.

Thanks to these provisions, the rollers of the front support supporting a leg portion of the harness can be moved apart from the rollers of the rear support supporting the back/headrest portion of the harness.

In some embodiments, the rotation of at least two rollers of a lateral drive system is driven by a single motor.

Thanks to these provisions, a single motor allows a plurality of rollers to be driven, thus reducing the number of motors and consequently the dimensions of the person transport device. For example, the device comprises a total of six rollers, each lateral drive system comprising one driving roller (driver roller) and two free rollers (driven rollers) driven by the driving roller by means of a belt.

Thus, in some embodiments, at least one lateral drive system comprises a driving belt connected to at least one first driver roller coupled to a motor, and to at least one second driven roller driven by this belt.

In some embodiments, the person transfer device comprises at least one sling carrier, and the carrier comprises a latch movable between an open position and a closed position to maintain the slings in position on the belt or on the rollers, such that the slings can only be detached when the movable latch is in the open position.

Thanks to these provisions, these slings can only be removed by the user when the movable latch is in the open position. The reduced risk of the sling being removed when the latch is in the closed position makes the transport of a person by means of the device of the invention secure.

In some embodiments, the person transfer device comprises a means for setting an item of information representative of the open or closed position of the latch, and wherein the operation of at least one motor actuating the tilting of the harness is controlled as a function of a detected closed position, such that the operation of the motors is inhibited unless a closed position is detected.

Thanks to these provisions, the operation of the motors can be inhibited if an open position is detected. This characteristic increases the security of the device, making it possible to prevent the motors being put into operation without the latches being secured in their latches beforehand.

In some embodiments, the person transfer device comprises a strap and a motorised winder configured to raise or lower the person transfer device as a function of the winding of this belt, which acts as a suspension shaft connected to a ceiling rail or other overhead support.

Thanks to these provisions, the person transfer device can be raised or lowered. The winder is also called the lifting module in the framework of the present invention. The winder can be incorporated directly in the person transport device or separate so as to form an intermediate part from which the person transport device can be suspended. Preferably, the winder is motorised.

In some embodiments, the coefficient of friction between at least one sling and a roller or between at least one sling and a belt is greater than 0.4, preferably greater than 0.6, preferably greater than 0.8, preferably greater than 1, even more preferably greater than 2.

In some embodiments, at least one sling and at least one roller intended to drive this sling comprise teeth complementary to each other.

In some embodiments, the person transfer device comprises at least one means for sensory stimulation, chosen from amongst a loudspeaker, a projector and an odour diffuser, making it possible to utilise therapeutic animations of chromotherapy, lighting effects, visual projections, sound effects or aromatherapy type.

Thanks to these provisions, a familiar or reassuring sensory stimulus can be diffused during person transport operations, making it possible to calm the person transported and consequently to facilitate his transport.

According to a second aspect, the invention envisions a harness for suspending a person by a person transport device according to the invention, which harness comprises a leg portion forming the seat bottom, a back portion forming the seat back, and two suspension slings each attached by one end to one point of the seat bottom and one point of the seat back, such that each suspension sling forms a large sling loop.

Thanks to these provisions, the harness referred to as the "double-loop harness" is suitable for use in combination with a person transport device described above.

In some embodiments, at least one sling of this harness has a flat rectangular cross-section comprising at least on one side a polyurethane type of rubber material coating so as to boost adhesion on the drive device of the person transfer device.

In some embodiments, at least one sling is attached to the harness by a removable attachment means.

In some embodiments, the harness comprises a first large sling loop on its right lateral portion, a second large sling loop on its left lateral portion, each of the loops being configured to be suspended from a drive system of the person transfer device described above.

In some embodiments, at least one sling comprises a means for adjusting the size of the sling.

BRIEF DESCRIPTION OF THE FIGURES

Other advantages, aims and particular features of the person transport device and the harness that are the subjects of the invention will become apparent from the non-limiting description that follows, with reference to drawings included in an appendix, wherein.

DESCRIPTION OF EXAMPLES OF REALISATION OF THE INVENTION

The present description is given in a non-limiting way, in which each characteristic of an embodiment can be combined with any other characteristic of any other embodiment in an advantageous way.

Note that the figures are not to scale.

Figure 21:
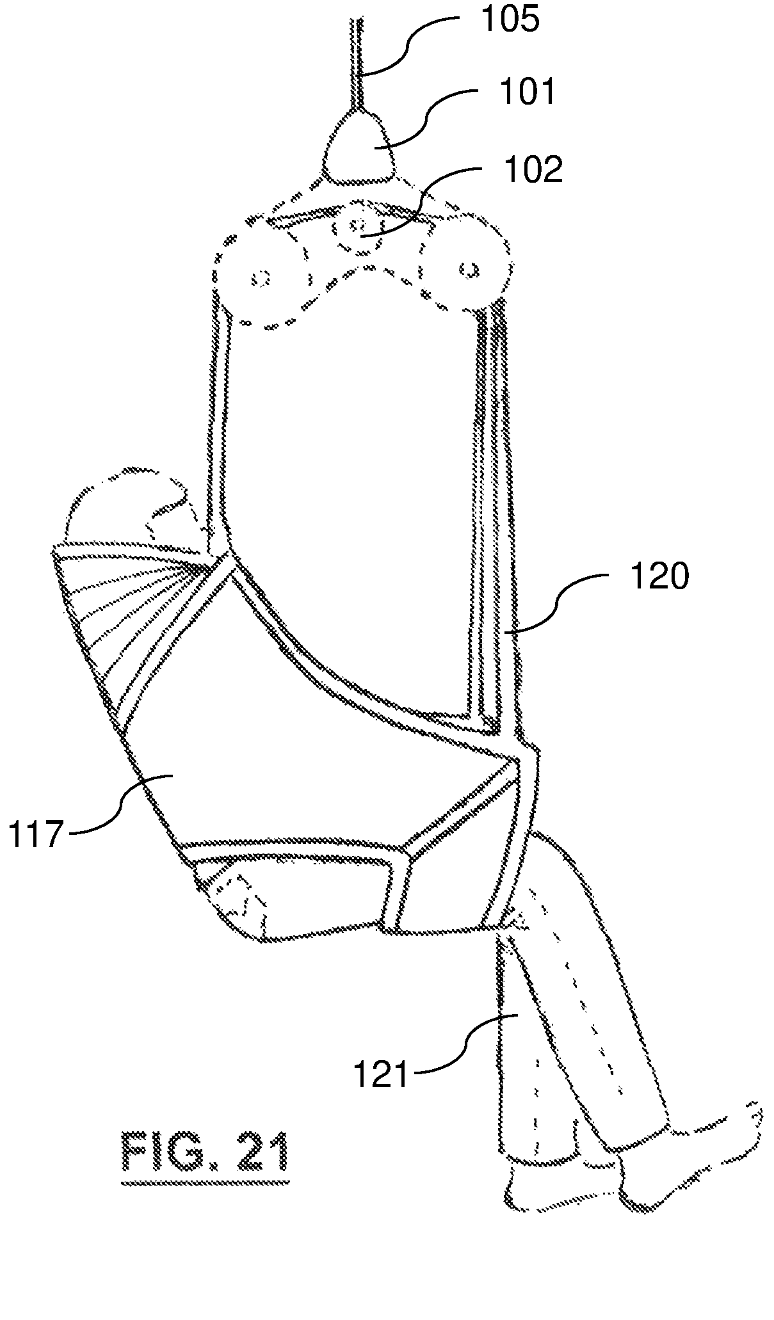
FIG. 21 represents, schematically and in a side view, a particular embodiment of the person transport device that is the subject of the invention, being used to transfer a person in a seated position by means of a ceiling rail.
Figure 22:
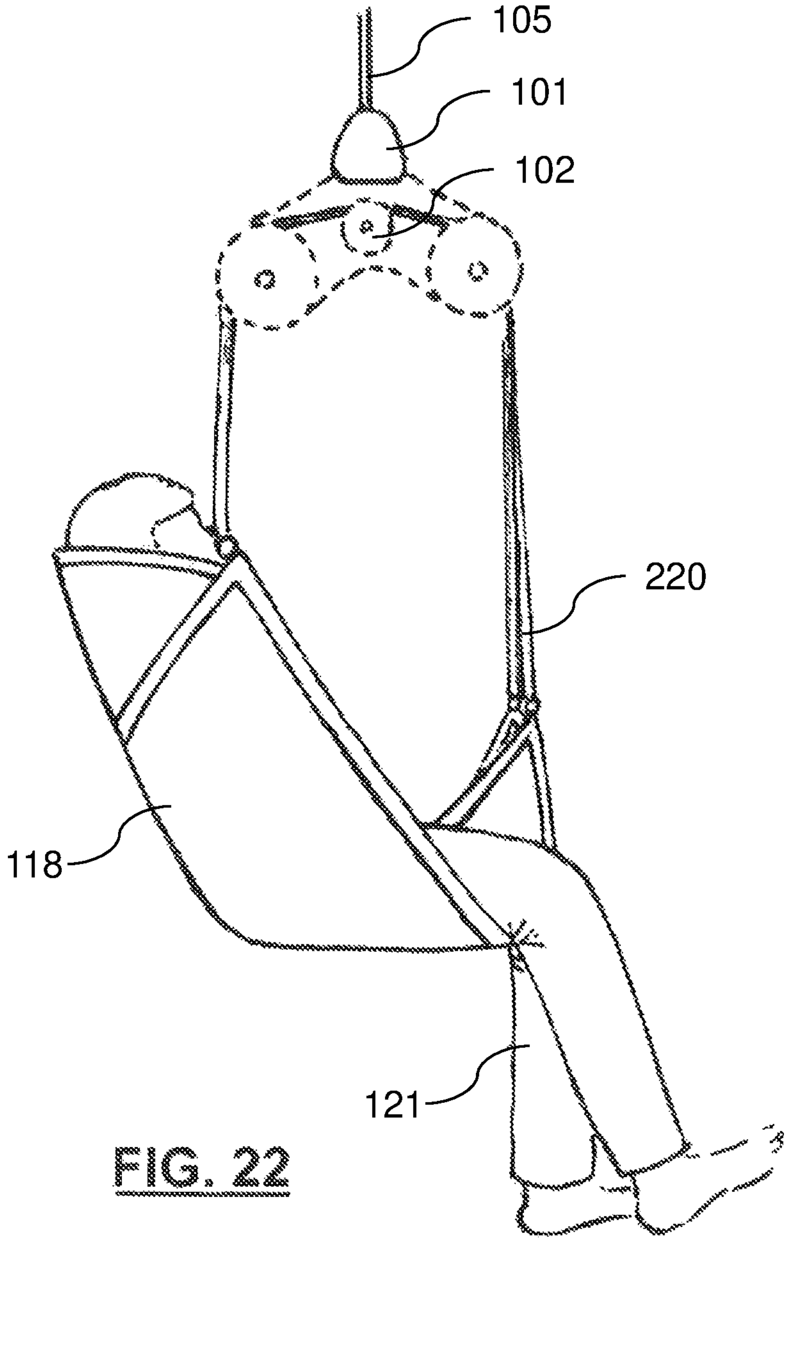
FIG. 22 represents, schematically and in a side view, a particular embodiment of the person transport device that is the subject of the invention, being used to transfer a person in a seated position by means of a ceiling rail.
Figure 23:
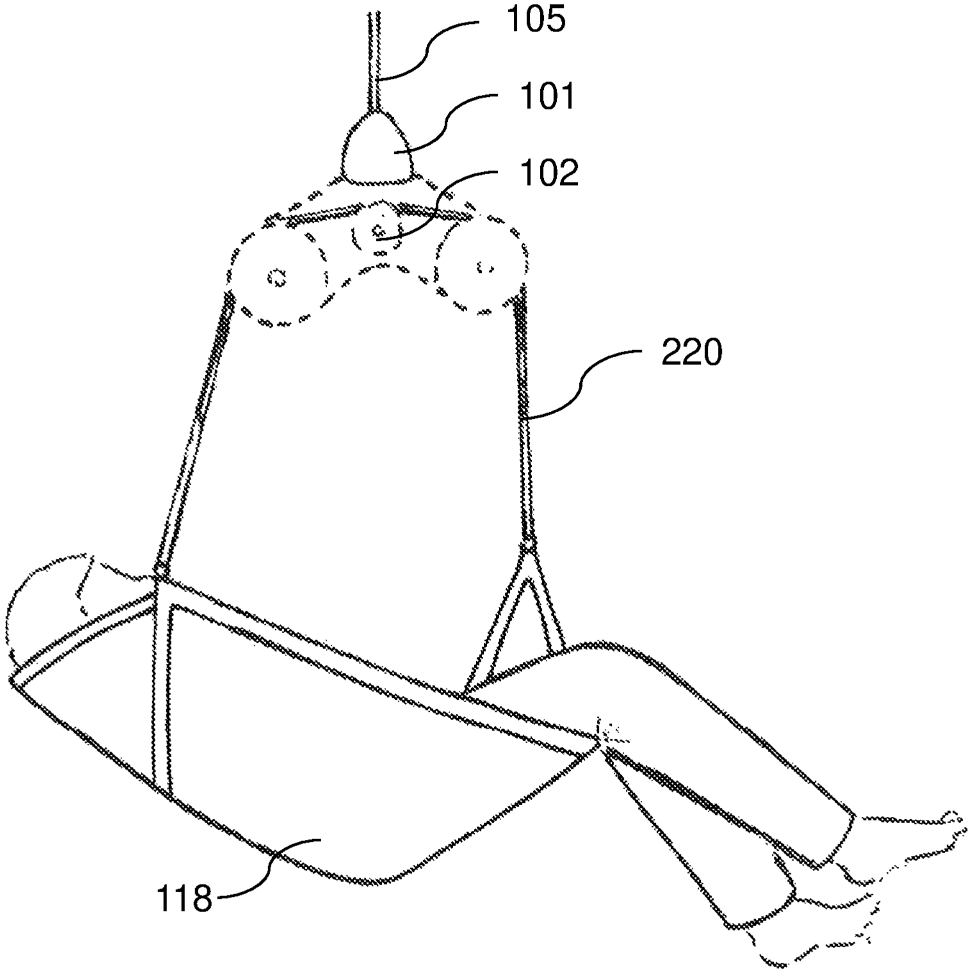
FIG. 23 represents, schematically and in a side view, a particular embodiment of the person transport device that is the subject of the invention, being used to transfer a person in a lying position by means of a ceiling rail.

FIGS. 1 to 5 illustrate a prehension device 101 of a person transfer device. The person transfer device as a whole, i.e. associated with a harness, is illustrated in FIGS. 21 to 23 and in FIG. 29.

The prehension device 101 comprises, for example, two symmetrical lateral drive systems, a first lateral drive system positioned on a left side of the prehension device 101, and a second lateral drive system on the right side of the prehension device 101.

Figure 1:
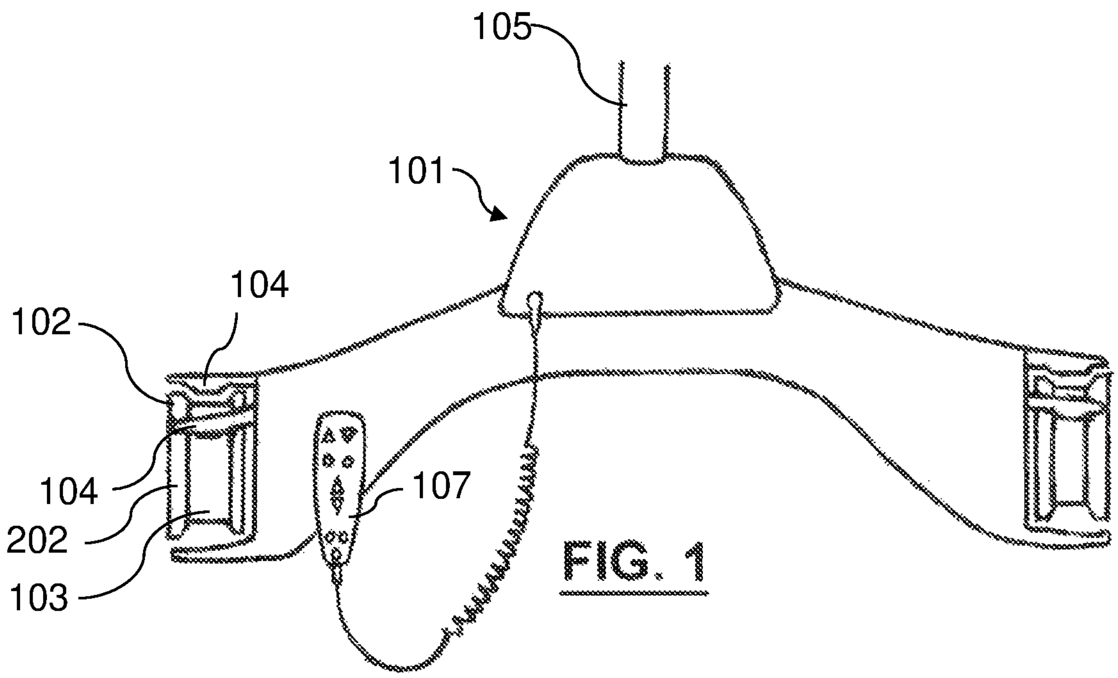
FIG. 1 represents, schematically and in a front view, a first particular embodiment of a prehension device of a person transport device that is the subject of the invention, shown in a configuration suspended from a ceiling rail.
Figure 2:
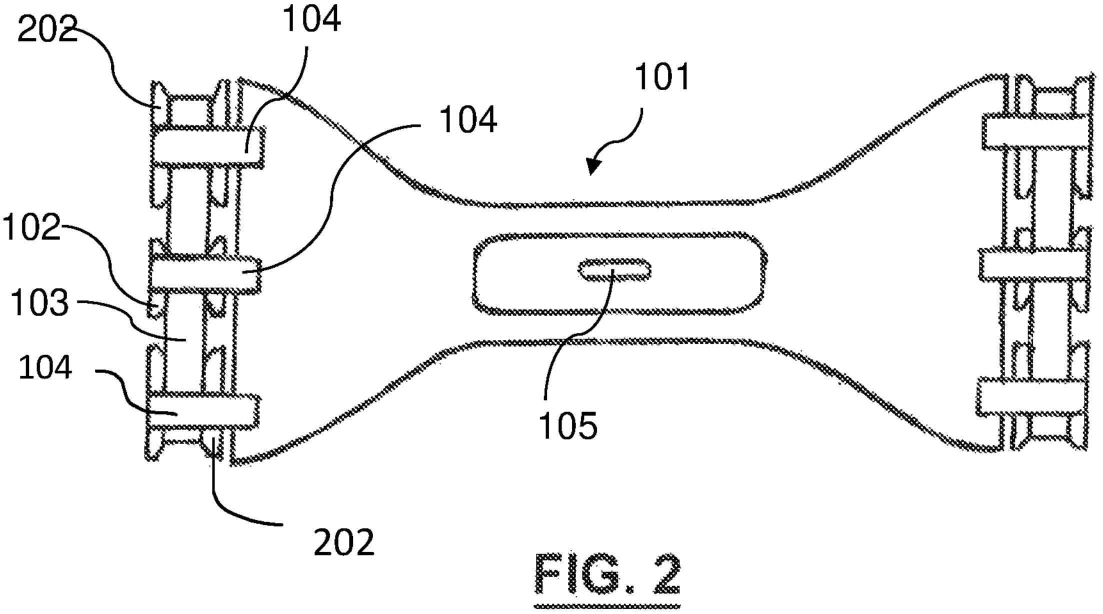
FIG. 2 represents, schematically and in a top view, the first particular embodiment of the prehension device.
Figure 3:
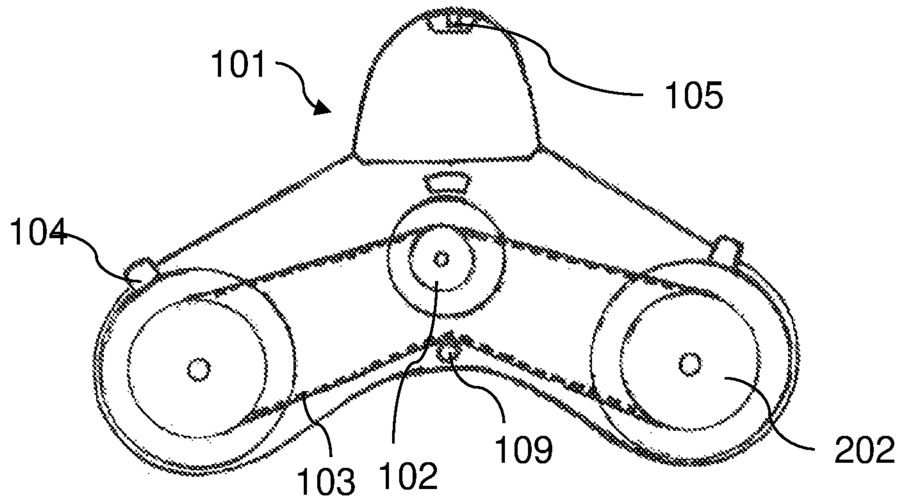
FIG. 3 represents, schematically and in a side view, the first particular embodiment of the prehension device.

One of the two lateral drive systems of the prehension device 101 can be seen in FIG. 3. Each lateral drive system comprises, for example, a belt 103 going round three rollers. One roller 102 drives the belt, and two rollers 202 are driven in their turn by the belt.

The belt 103 of each lateral drive system of the prehension device 101 is intended to support a large sling loop, 120 or 220, attached to a harness. The harness is, for example, of the type illustrated in FIGS. 24 to 26. This embodiment has the particularity that the large sling loops, 120 and 220, are on the one hand in contact with the belts 103 which are, on the other hand, in contact with the large sling loops, 120 and 220. The large area of contact between the large sling loops and the belts on which they rest makes it possible to obtain a high coefficient of friction between these large sling loops and these belts.

Thus, setting the rollers in rotation sets the roller 103 in motion which, in its turn, makes the harness pivot to obtain a desired tilt. FIGS. 21 to 23 respectively illustrate a seated position and a lying position of the harness 117 and 118.

In other words, according to the first particular embodiment the prehension device 101 comprises six rollers in total, with three on each of the extremities of the prehension device 101, i.e. three for each lateral drive system. According to this embodiment, the central rollers 102, referred to as the "driver" roller, are motorised and have an independent transmission. The driver rollers, in their turn, drive the rollers 202 by means of the belt 103. This device has a small tensioner roller 109 that enables the tensioning of the belt 103, this tensioner roller 109 can exert a predefined tension on the belt 103 by means of a spring or by means of an adjustment with a screw.

Note that the prehension devices 101 shown in FIGS. 21, 22, 23 and 29, comprise, for example, a belt of the type described above but, in order to enable better visibility of the route of the slings 120 and 220, these are not shown.

In some embodiments, a roller 102 is a roller motorised by means of a motor configured to put it into rotation, and a roller 202 is a roller driven by the belt 103. In other embodiments, each roller is motorised independently.

In some embodiments, the large sling loops, 120 and 220, rest by gravity directly on the rollers 102 and 202. The friction of the rollers of the drive systems against the surface of the sling loops results in the rotation of at least one portion of the harness.

The prehension device 101 comprises, for example, a means for suspension from a ceiling rail or a lifting arm. Preferably, the suspension means is configured to make the prehension device rise and descend. For example, the suspension means comprises a strap and a motorised winder configured to raise or lower the person transfer device as a function of the winding of this belt, which acts as a suspension shaft connected to a ceiling rail or other overhead support.

When the suspension means of the prehension device comprises means configured to make the person transport device rise and descend, it can be referred to as a "person lift". This is the case of the devices illustrated in FIGS. 1 to 5, 8 to 14, 20 to 23 and 29.

In some embodiments, the prehension device 101 is equipped with stops 115 on either side of the upper portion of each of the rollers, on which the sling loop 120 or 220 rests. These stops 115 make it possible to avoid the untimely disengagement of the sling loop, 120 or 220, from the rollers 102. Preferably, an additional safety device secures the sling loop in place against the rollers. It consists, for example, of a safety latch of the type detailed in FIGS. 16 and 17.

In some embodiments, the first and second lateral drive systems can be actuated separately. Therefore the device makes it possible to activate the rotation of a single side and consequently of a single sling loop, 120 or 220. That makes it possible to easily adjust the length of the slings of the double-loop harness to ensure a perfect symmetry, and conversely this action can be used to adjust different lengths so as to make the sides asymmetric to compensate for a partial lack of tonicity linked to the pathology a person can have, in the case of hemiplegia for example.

Figure 4:
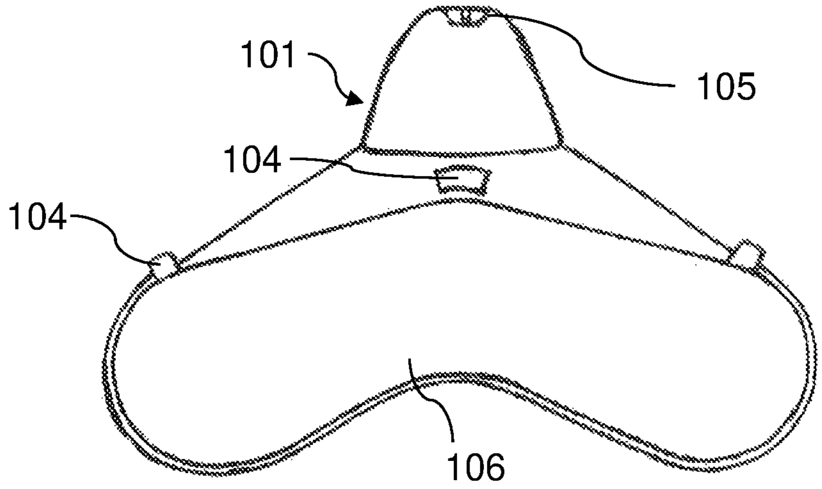
FIG. 4 represents, schematically and in a side view, the first particular embodiment of the prehension device.
Figure 5:
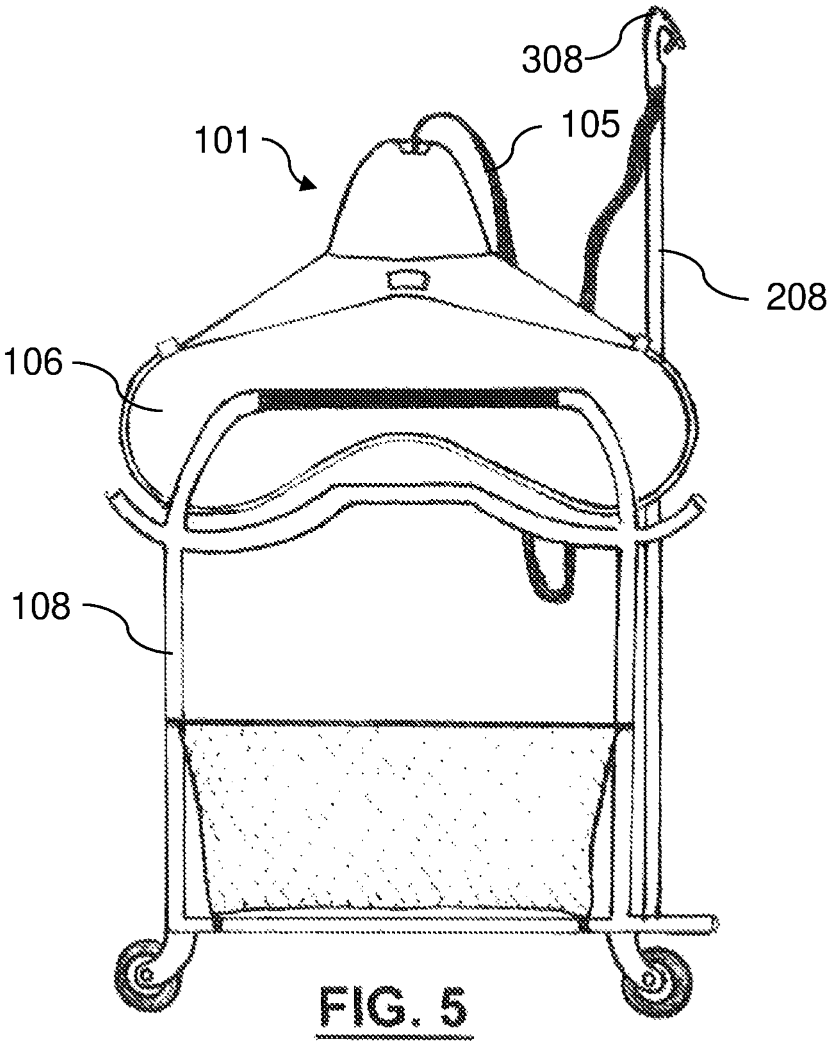
FIG. 5 represents, schematically and in a side view, the first particular embodiment of the prehension device, placed on a transport gurney.

With reference to FIGS. 4 and 5, a cover 106 is illustrated that covers the prehension device 101 on its lower surfaces, directed towards the ground, and lateral surfaces to optimise safety and aesthetics. The cover 106 also facilitates cleaning and disinfection operations. FIG. 5 illustrates the prehension device 101 placed on a transport gurney 108, which comprises an attachment pole 208 and a hook 308 allowing the personnel operating the prehension device to suspend this device from an overhead transfer rail.

Figure 6:
FIG. 6 represents, schematically and in a cross-section and perspective view, a drive belt utilised in a particular embodiment of a person transport device that is the subject of the invention.

With reference to FIG. 6, which illustrates the belt 103, also called crawler track, it is stated that the belt 103 can be notched on its lower portion, in contact with the driver roller 102 and the driven rollers 202, to ensure greater precision of movement. The outer surface of the belt 103 is preferably smooth and sufficiently rough to drive the large sling loops 120 and 220 of the harness. In addition, the smooth outer surface of the belt 103 facilitates the disinfection operations from the notches of the motor casing.

Note that the coefficient of friction between the sling, 120 or 220, and the surface of the belt or the surface of a roller in contact with this sling is preferably greater than 0.4, preferably greater than 0.6, preferably greater than 0.8, preferably greater than 1, even more preferably greater than 2.

In some embodiments, the person transport device that is the subject of the invention is supplied with a remote control configured to control its operation.

Figure 7:
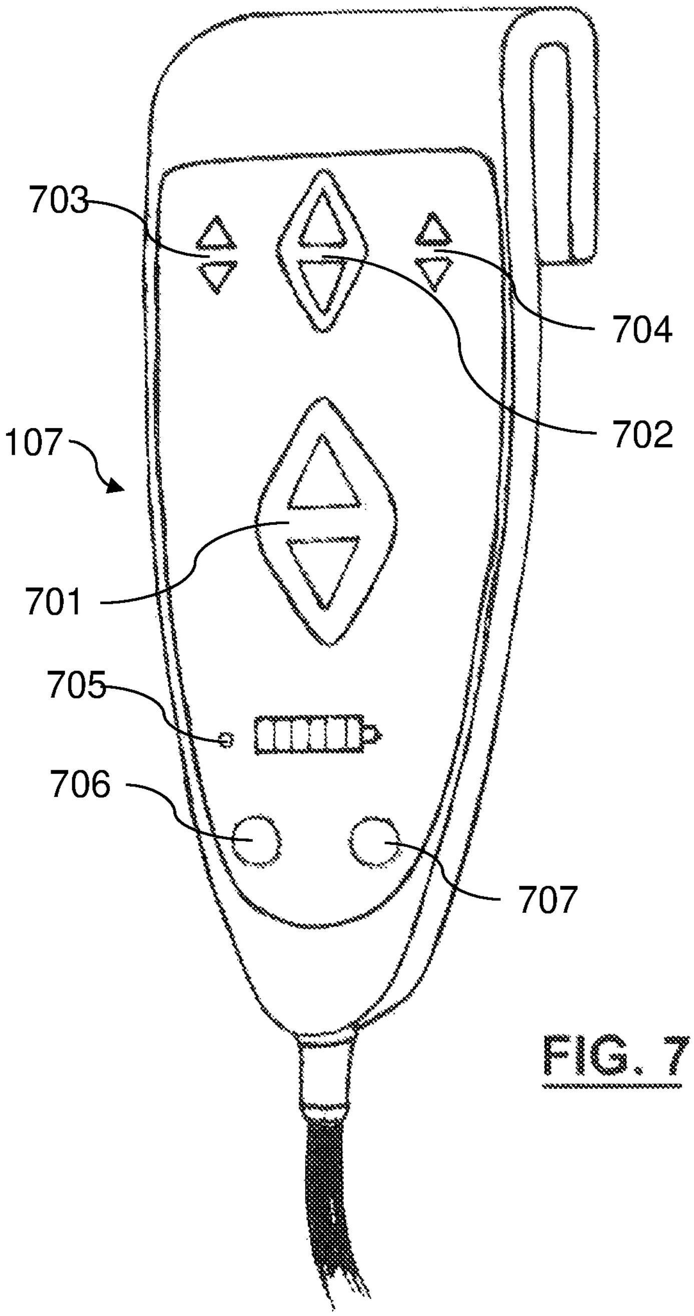
FIG. 7 represents, schematically and in a perspective view, a remote control utilised in a particular embodiment of the device that is the subject of the invention.

FIG. 7 illustrates a particular example of such a remote control 107 which comprises at least one push-button or any other type of switch or human-machine interface allowing at least one of the functions from amongst the following functions:

a function 701, which controls the raising and lowering of the prehension device when it is connected to a ceiling transfer rail;

a function 702, actuating two lateral drive systems simultaneously to drive the two slings of the harness in the forward direction to position a person in the seated position, or in the backward direction to position a person in the lying position, or to adjust an intermediate position;

- a function 704, actuating a single lateral drive system of the harness sling, solely on the right side, in the forward or backward direction, which allows the harness to be adjusted to make the two sides symmetrical or, conversely, cause an asymmetric position to compensate for the person's hemiplegia or handicap; and
- a function 703, actuating a single lateral drive system of the harness sling, solely on the left side, in the forward or backward direction, which allows the harness to be adjusted to make the two sides symmetrical or, conversely, cause an asymmetric position to compensate for the person's hemiplegia or handicap.

According to other optional realisation options:

- the functions 702 to 704 are secured by restraining the movement to a predefined travel that is relatively short and controlled, to prevent any tipping over of the person;
- the remote control 107 comprises an indicator 705, corresponding to a charge indicator of a battery incorporated in the person transport device;
- a function 707, controlling an emergency stop; and
- a function 706, controlling an electrical emergency descent which makes it possible to bring the person transport device back down in the event of a battery failure or any other failures.

The wired remote control 107 can be infra-red, and the controls that the remote control 107 comprises are preferably duplicated on the device for use in the event of a failure of the latter 107.

Preferably, the main controls concerning the functions of the remote control are at least in part also present on the body of the prehension device of each of the embodiments illustrated in the present application, preferably comprising a mechanical emergency descent. These provisions allow the person transport device to be used if the remote control is defective. The remote control can be wired or wireless. In some embodiments, the remote control is temporarily fixed to the prehension device by means of a magnet.

Figure 8:
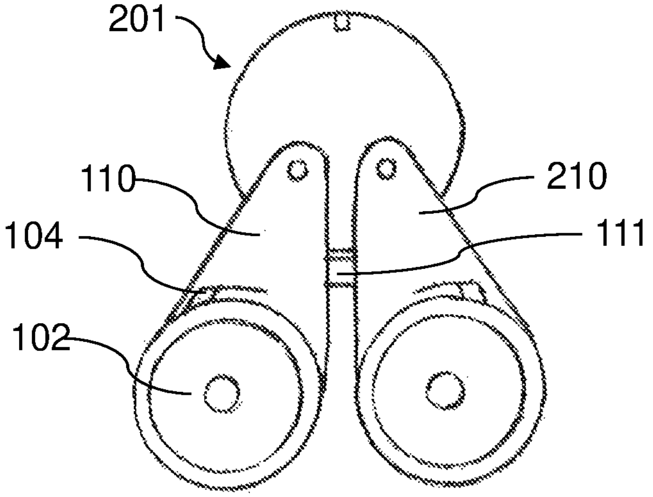
FIG. 8 represents, schematically and in a side view, a second particular embodiment of a prehension device of a person transport device that is the subject of the invention.
Figure 9:
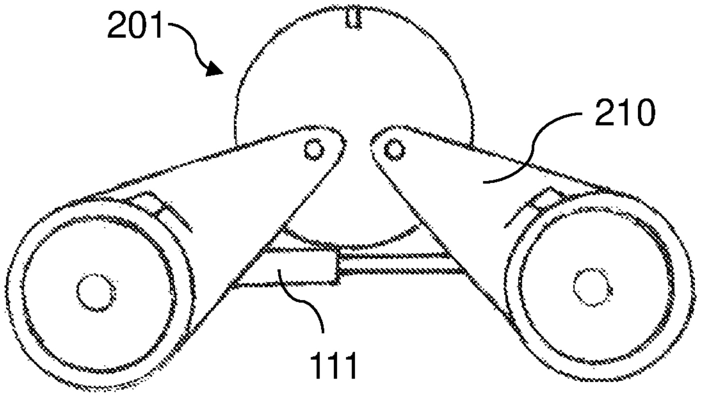
FIG. 9 represents, schematically and in a side view, the second particular embodiment of the prehension device.

FIGS. 8 and 9 illustrate a second embodiment of the prehension device 201 of the person transport device. According to this variant, the prehension device 201 has no belt. According to this embodiment, the large sling loops rest directly on the rollers 102, at least one roller 102 being a motorised driver roller, so as to allow the tilting of the harness. According to a particular embodiment, the prehension device 201 comprises four rollers 102, which perform the movement of the large sling loops, 120 and 220, of the harness with at least the same functions as mentioned in the description of the remote control 107.

In addition, the prehension device 201 comprises two mobile supports, 110 and 210, where a first is positioned on the front portion of the device and a second is positioned on the rear portion of the device. Each mobile support 110 and 210 comprises on its extremity two rollers 102, where one roller 102 belongs to the right lateral drive system and one roller 102 belongs to the left lateral drive system.

In FIGS. 8 and 9 in a side view, the two mobile supports 110 and 210 can be distinguished. Only the front left and rear left rollers, both belonging to the left lateral drive system, can be seen here. The prehension device 201 comprises an actuator 111 fixed, firstly, to the mobile extremity of the mobile support 110 of the front roller and fixed, secondly, to the mobile extremity of the mobile support 210 of the rear roller.

The particularity of this variant is to allow the actuator 111 to be retracted to reduce the dimensions of the prehension device 201, as illustrated in FIG. 8. The retraction of the actuator 111 also makes it possible to reduce the spacing between the two counterparts of each large sling loop in order to facilitate transfers in a seated position.

In contrast, the extension of the actuator 111, illustrated in FIG. 9, causes the two front and rear rollers supported by the mobile supports 110 and 210 to spread apart so as to increase the spacing between the two counterparts of each large sling loop to facilitate the transfers in a lying position. This variant preferably comprises two lateral electric actuators 111 which perform the spacing of these mobile supports 110 and 210, and the use of a single actuator shared by the two sides of the prehension device 201 can be envisaged.

Preferably, the prehension device 201 is supplied with a remote control, which also comprises functions controlling the separation and coming together of the mobile supports, 110 and 210, by the extension or retraction of the actuator 111.

Figure 10:
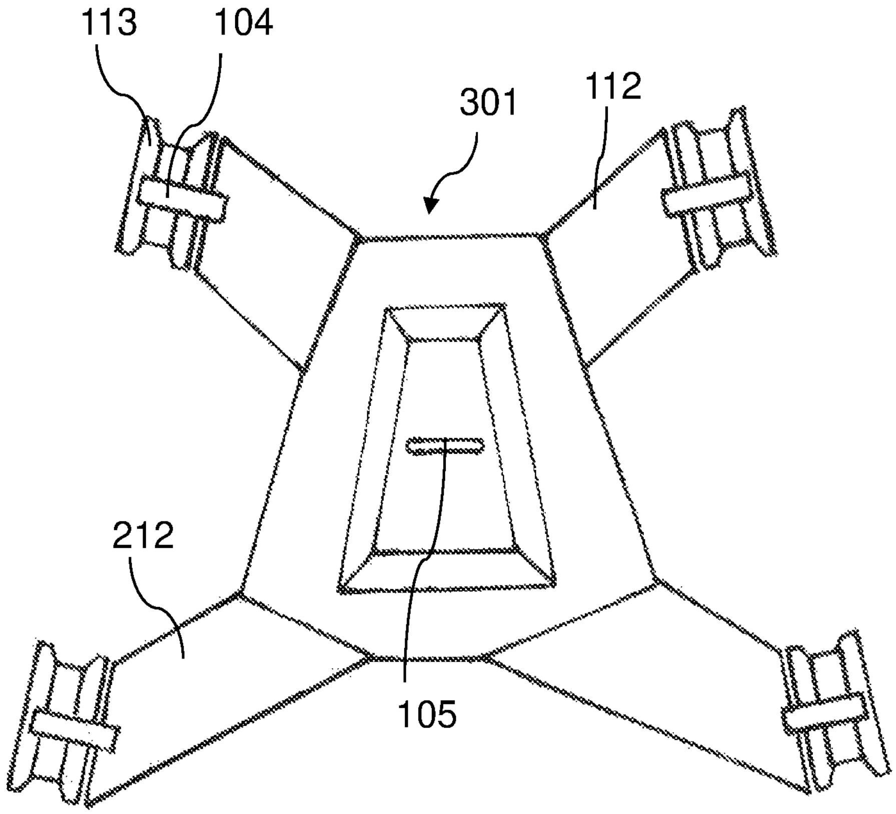
FIG. 10 represents, schematically and in a top view, a third particular embodiment of the prehension device of the person transport device that is the subject of the invention.
Figure 11:
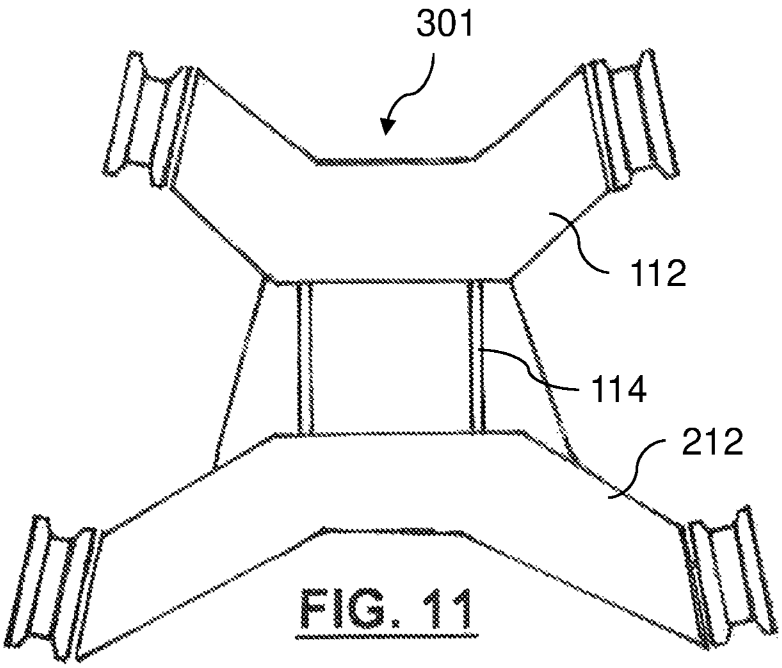
FIG. 11 represents, schematically and in a bottom view, the third particular embodiment of the prehension device.
Figure 12:
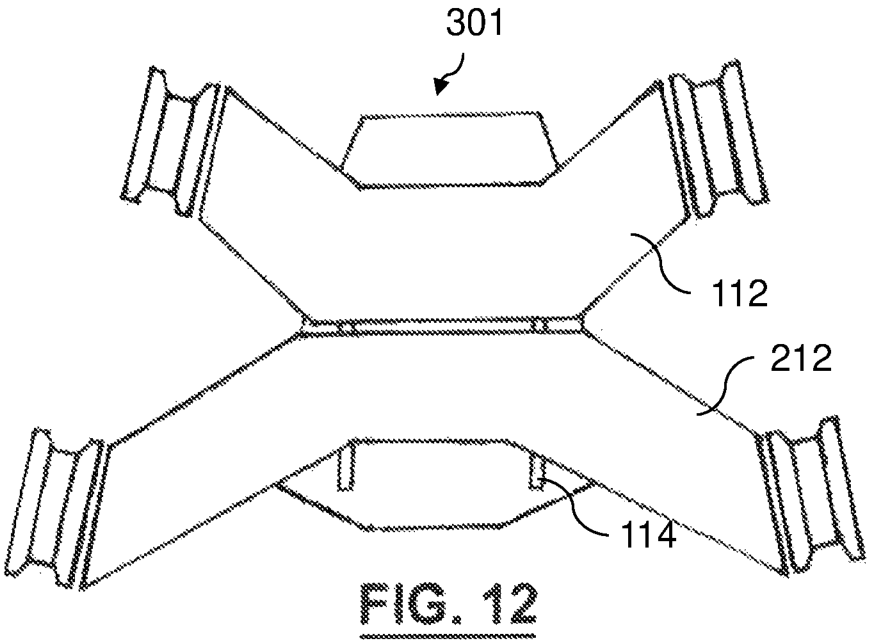
FIG. 12 represents, schematically and in a bottom view, the third particular embodiment of the prehension device.

FIGS. 10, 11 and 12 illustrate a third embodiment of a prehension device 301 of the person transfer device that is the subject of the invention.

The prehension device 301 has no belt, and comprises four rollers, motorised and asymmetric 113 fixed two by two on a first support 112, referred to as the "front support", and on a second support 212 of two rollers, referred to as the "rear support". The spacing distance between the rollers of the front support is smaller than the spacing distance between the rollers of the rear support, such that two axes, each traced between one roller of the front support and one roller of the rear support, are not parallel to each other and intersect in a "V" next to the front support.

In other words, two of the four motorised rollers 113 retract inwards in the same direction towards the front portion of the device, and the two supports, 112 for the front and 212 for the rear, ensure the movement of the motorised rollers 113 via movement in horizontal translation bringing them closer together towards the inside or farther apart towards the exterior.

The particularity of this variant is the sliding mobility of the front and rear supports, 112 and 212, on parallel rails 114 provided in the body of the prehension device 301. These provisions make it possible to have a compact device for seated transfers and be able to open the two supports 112 and 212 by sliding towards the exterior to favour the tilting of the harness that supports the person in the lying position. The opening device is preferably actuated by an electric actuator (not shown) incorporated into the body of the prehension device 301.

Figure 13:
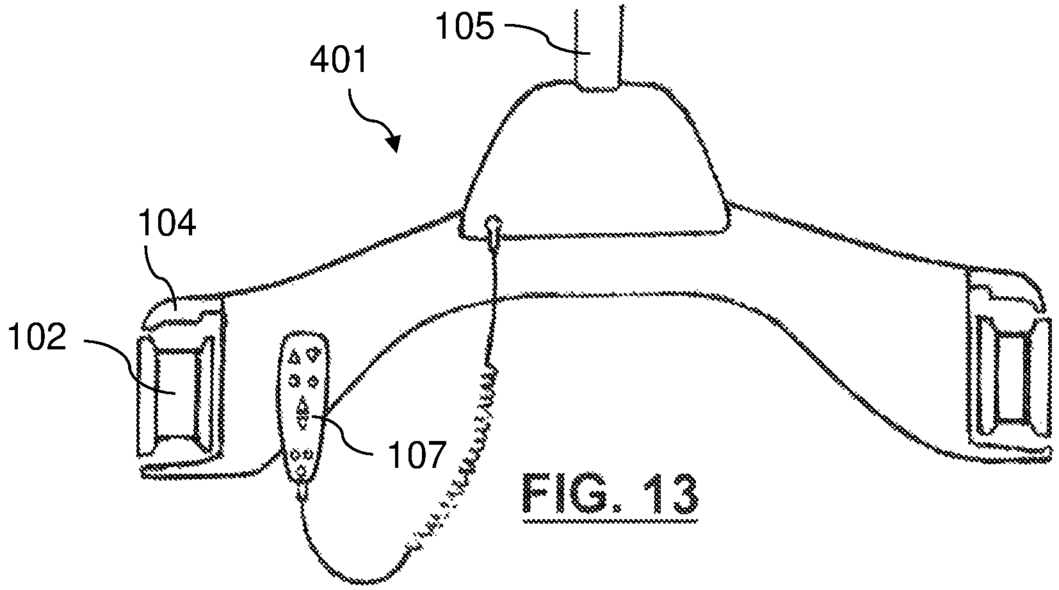
FIG. 13 represents, schematically and in a front view, a fourth particular embodiment of a prehension device of the person transport device that is the subject of the invention, shown in a configuration suspended from a ceiling rail.
Figure 14:
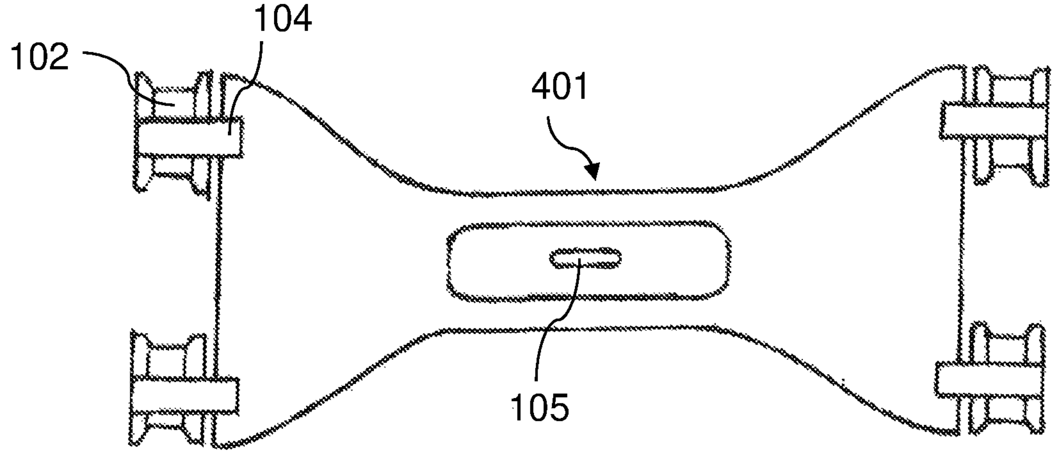
FIG. 14 represents, schematically and in a top view, the fourth particular embodiment of the prehension device.

Preferably, the prehension device 301 is supplied with a remote control, which also comprises functions controlling the opening and closing of the mobile supports by translation. FIGS. 13 and 14 illustrate a fourth embodiment of the prehension device 401 of the person transport device that is the subject of the invention.

According to this variant, the prehension device 401 has no belt, and comprises four rollers 102, arranged on two axes parallel to each other. At least one roller is motorised for each side of the prehension device 401 supporting a large sling loop. Preferably, the prehension device 401 performs all the functions mentioned in the description of the remote control 107.

Figure 15:
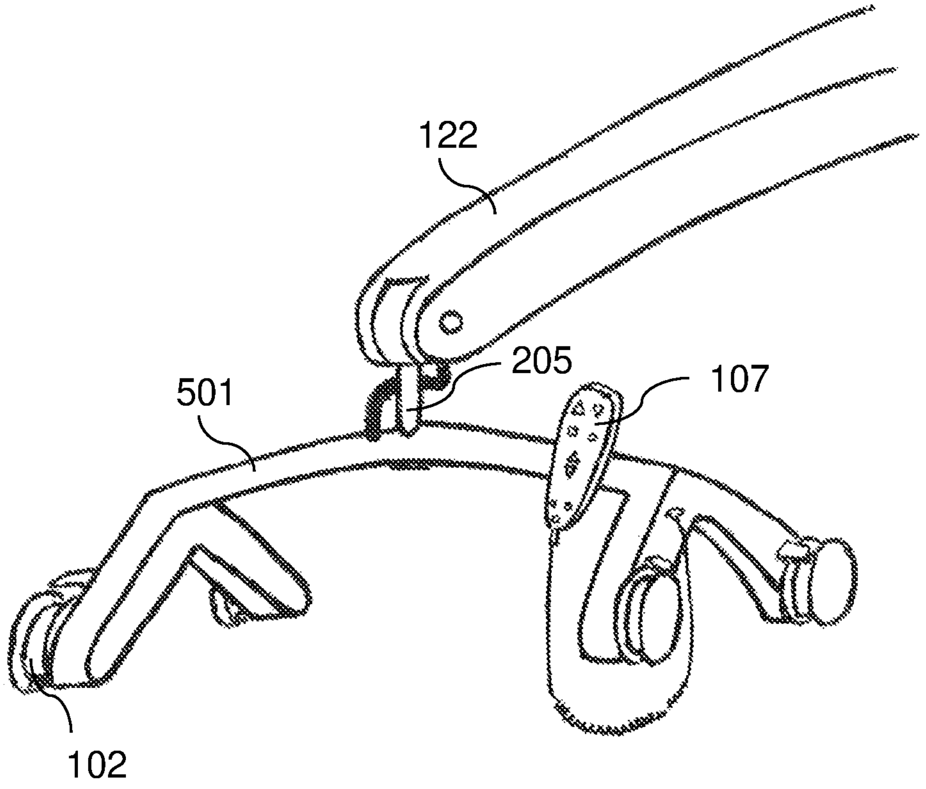
FIG. 15 represents, schematically and in a perspective view, a fifth particular embodiment of the prehension bar of the person transport device that is the subject of the invention.

FIG. 15 illustrates a fifth embodiment of a prehension device in the form of a prehension bar 501 adapted to accessorise an arm 122 or a lifting module, where this variant comprises no integrated raising and lowering function. The prehension bar 501 has no belt, and comprises four parallel motorised rotating rollers 102. The prehension bar 401 is suspended from a mobile person-lift arm 122.

In other modes of implementation the prehension bar 501 is suspended from a suspension shaft of a lifting device fixed under a ceiling transfer rail.

The prehension bar 501 has all the functions mentioned in the description of the remote control 107 except for the function 701 that raises the device, this being advantageously performed by the lifting arm 122 of the person lift. In addition, the electrical power supply of the rollers is provided by a remote battery on the mobile person lift via a cord connected to the lifting arm 122.

With regard to a possible installation on a motor fixed on a ceiling rail, the power supply of the device can be incorporated in the latter or it can be recharged directly while parked in contact with this lifting module.

All the prehension devices 101, 201, 301, 401 and 501 preferably incorporate a safety latch to prevent any removal of the harness during the transfer operations.

Figure 16:
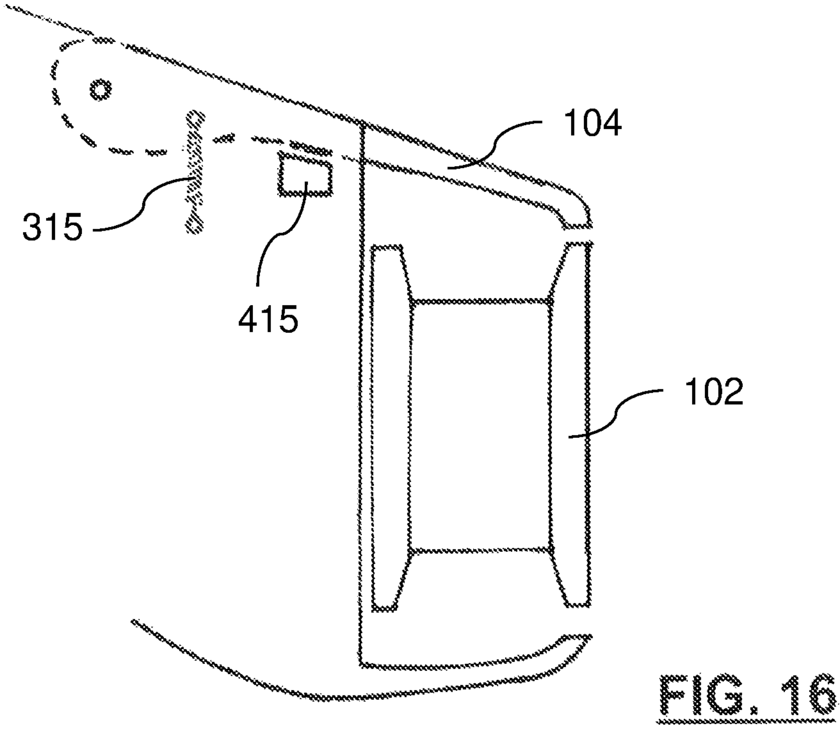
FIG. 16 represents, schematically and in a front view, a first particular embodiment of a latch in the closed position, shown without a sling.
Figure 17:
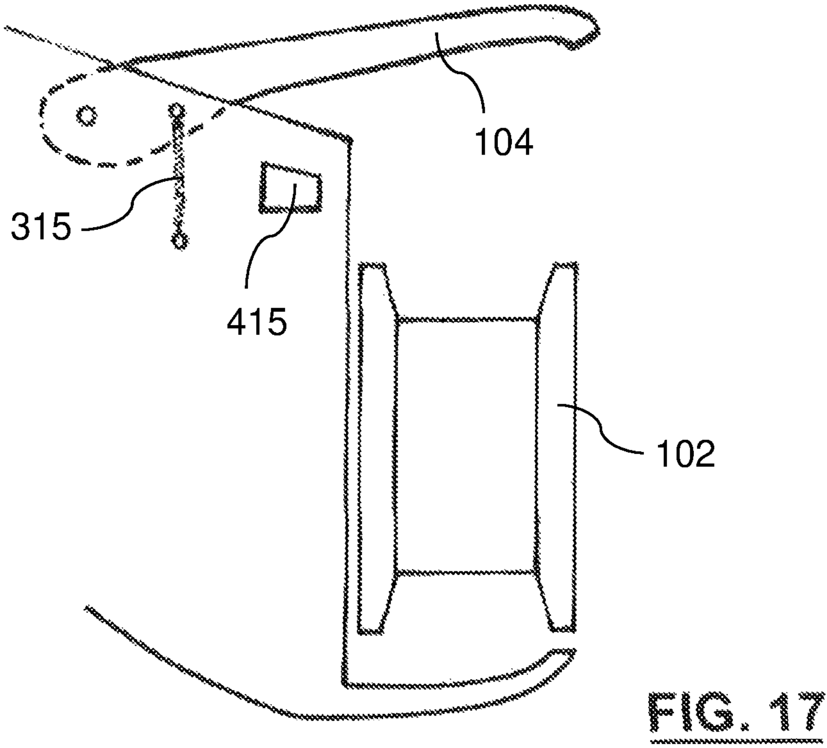
FIG. 17 represents, schematically and in a front view, the first particular embodiment of the latch in the open position, shown without a sling.

With reference to FIGS. 16 to 17, according to a first configuration, the latch 104 is actuated by opening upward and it is held in place by the action of a spring 315. The user only has to lift the latches 104 in order to place the large sling loops, 120 and 220, on the motorised rollers. Other locking devices can replace the one presented, or be combined with it.

In some embodiments, the prehension device comprises a means for detecting an item of information representative of the open or closed position of the latch, and the operation of the prehension device is controlled according to the open or closed position detected, such that the operation of the motors can be inhibited if an open position is detected or such that a brake can be engaged. For example, a contact sensor 415 inhibits the rotation of the rollers unless a closed position of the safety latch 104 is detected.

In some embodiments, a magnet locks the latches in their closed position when the prehension device is in operation.

Figure 18:
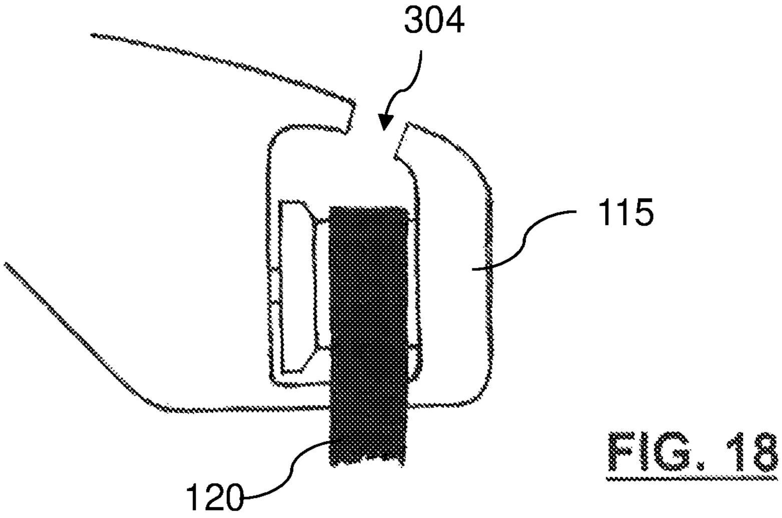
FIG. 18 represents, schematically and in a front view, a sling loop carrier utilised in a particular embodiment of the device that is the subject of the invention, shown with a sling.

In some variants, according to a second configuration the latch 104 is incorporated into a portion of casing surrounding a roller and forming a stop 115. FIG. 18 illustrates an opening 304, configured for sliding the large sling loops, 120 and 220, of the harness into it from above.

Figure 19:
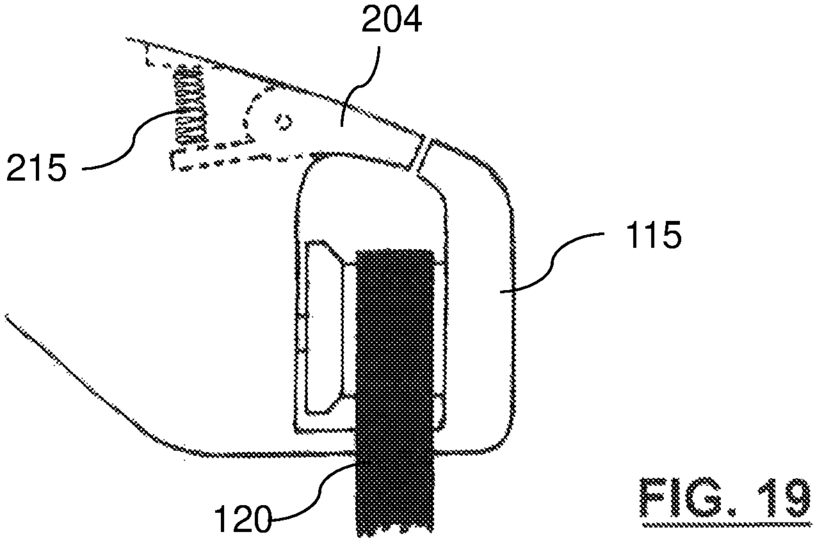
FIG. 19 represents, schematically and in a front view, a second particular embodiment of a latch in the closed position, shown with a sling.

As illustrated in FIG. 19, the latch incorporates a hook 204 which descends when it is subjected to a pressure exerted downward to position the large sling loops, 120 and 220, on the motorised rollers 102, and the latch 204 rises to automatically lock the device under the action of the spring 215.

In other words, according to a particular embodiment, each of the motorised rollers is incorporated into a hook with at least one locking device so as to secure the suspension sling of the harness on the driving roller of the traction means.

Figure 20:
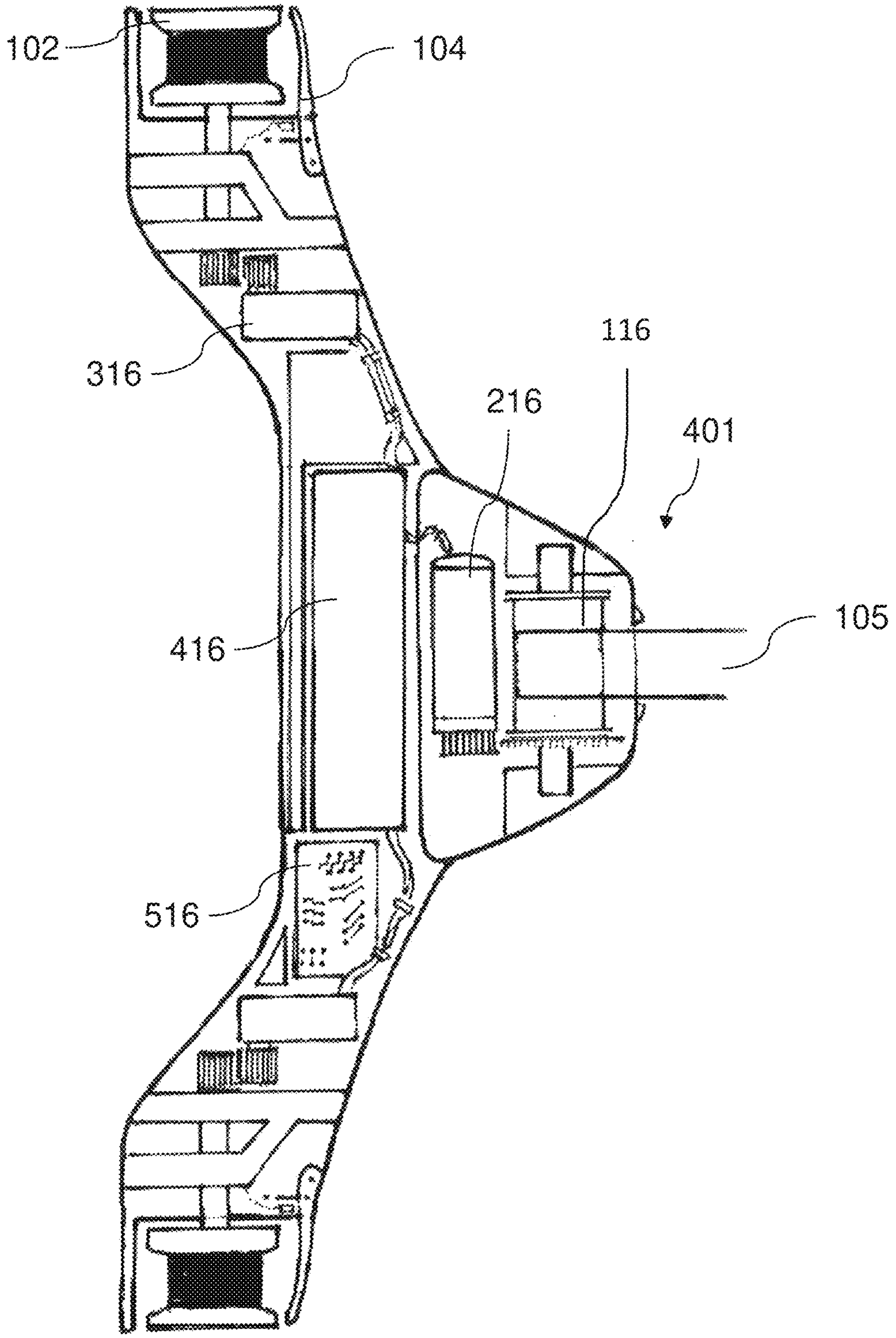
FIG. 20 represents, schematically and in a front cross-section view, a particular embodiment of a prehension device of a person transport device that is the subject of the invention.

FIG. 20 illustrates some elements that comprise the prehension device 401, in a partial front cross-section view.

The prehension device 401 comprises safety latches 104 and motorised rollers 102, already described above. The prehension device 401 also comprises:

- a strap 105 connected by a hook (not shown) to the rolling carriage suspended from a ceiling transfer rail;
- a winder 116 which performs the raising and lowering of the prehension device 401 by rolling up and unrolling the strap 105;
- a motor 216 which powers the winder 116;
- a motor 316 which powers the motorised rollers 102;
- a battery 416 positioned at a central symmetry point for an even load distribution; and
- an electronic board 516 comprising a microprocessor controlling various motors and systems, described above, of the person transport device according to the invention.

In some embodiments (not shown), the prehension device has a single motor for powering the rollers of the two lateral drive systems. Preferably, by a declutching or locking action of the mechanical transmission, the single motor can, according to a command by the user, selectively actuate the rollers of a single lateral drive system on the desired side. The prehension device, 101, 201, 301 and 401, comprises a chassis preferably comprising a fibre-reinforced plastic or a reinforced acrylonitrile butadiene styrene (abbreviation “abs”) plastic, and can be made of aluminium or any other alloy. The structure of the chassis of the prehension device 501 is preferably made of steel or aluminium, which allows the structure to be thin and resilient. As for the battery 416, it is preferably of Lithium or lead technology, and the device can incorporate a plurality of batteries if necessary. FIG. 21 illustrates a particular embodiment of a person transport device according to the invention comprising the prehension device 101 and a transfer harness 117 with two loops integral with this harness, during an operation transferring a person 121 in a seated position. This representation makes it possible to follow the route of the slings 120, which rest on drive belts designed to perform a predefined rotation of these slings.

The harnesses shown in FIGS. 21 to 25 are referred to as passive harnesses, which allow a person to be transported without muscular effort by the person transported. In contrast, a harness of the type illustrated in FIG. 26 is intended to support all or part of the weight of the person who must move by himself.

FIG. 22 illustrates an embodiment similar to that in FIG. 21 with the particularity that the double-loop transfer harness 118 comprises slings 220 that can be removed from the harness 118 by unhooking a snap hook or a clip arranged at one extremity of the sling and intended to be engaged on an attachment point arranged on the harness 118.

FIG. 23 illustrates a harness 118 during an operation transferring a person in a lying position at about 80 degrees. This position has been achieved by slings being driven by the prehension device with motorised drive.

Figure 24:
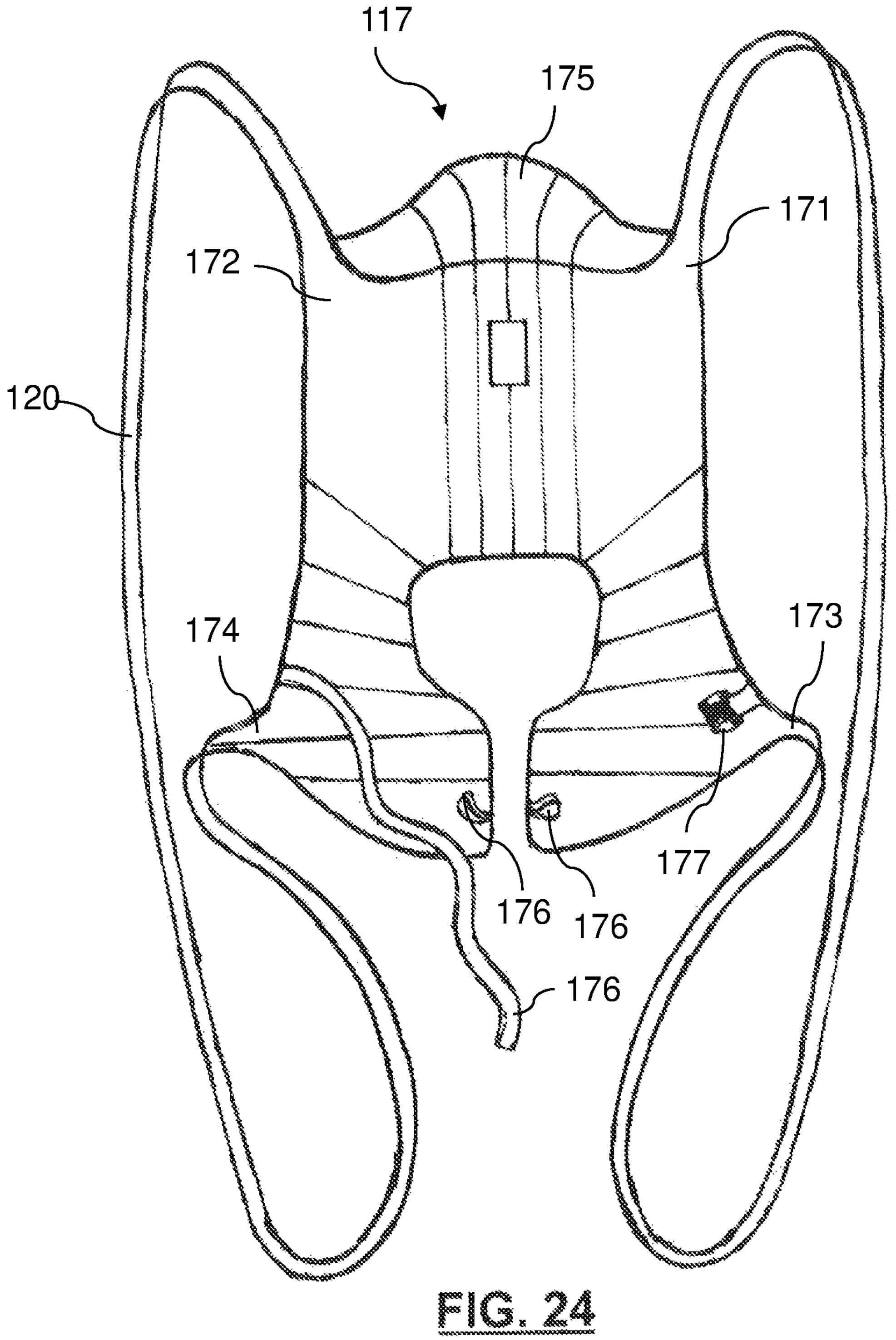
FIG. 24 represents, schematically and in a front view, a particular embodiment of a double-loop transfer harness.

FIG. 24 illustrates an embodiment that shows a transfer harness 117 with two loops integral with this harness, illustrating the specific feature of the person transfer device according to the invention. In effect, the harness 117 comprises two suspension slings positioned bilaterally forming two large loops. The left sling 120 is attached firstly to the left back portion 171 and secondly to the left leg portion 173 so as to form a first closed large loop. The right sling 120 is attached firstly to the right back portion 172 and secondly to the right leg portion 174 so as to form a second closed large loop. A fastener 176 makes it possible to close the thigh support of the leg portions once connected on the loop 177. Reference 175 illustrates the headrest of the harness. In this particular configuration, one of the extremities of each of the slings 120 is attached to the exterior side portions of the leg portions, i.e. 173 and 174.

Thanks to these provisions, the two slings 120 can therefore be connected in complete safety in the hooks that incorporate the drive device of these suspension slings.

Figure 25:
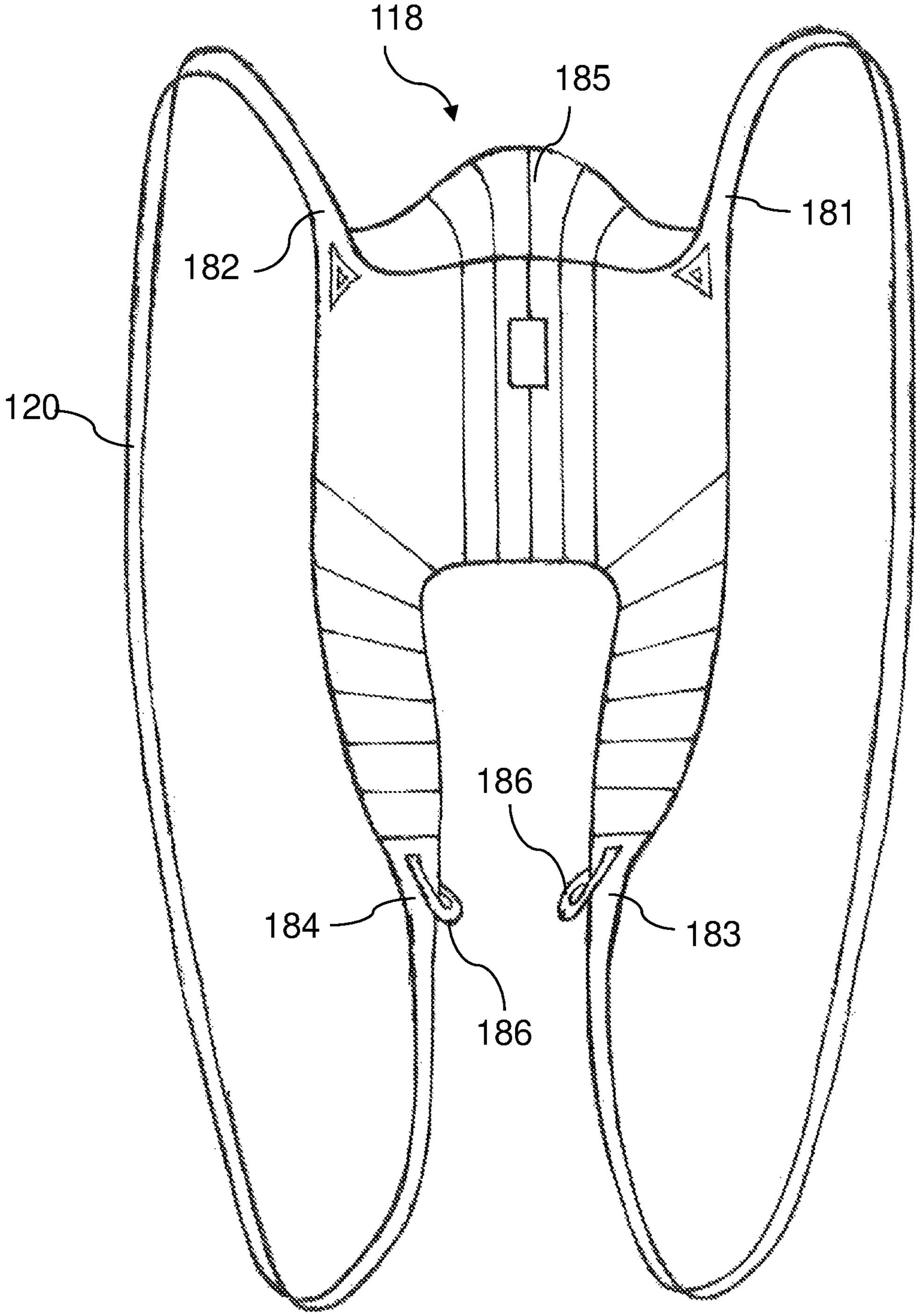
FIG. 25 represents, schematically and in a front view, a particular embodiment of a double-loop transfer harness.
Figure 26:
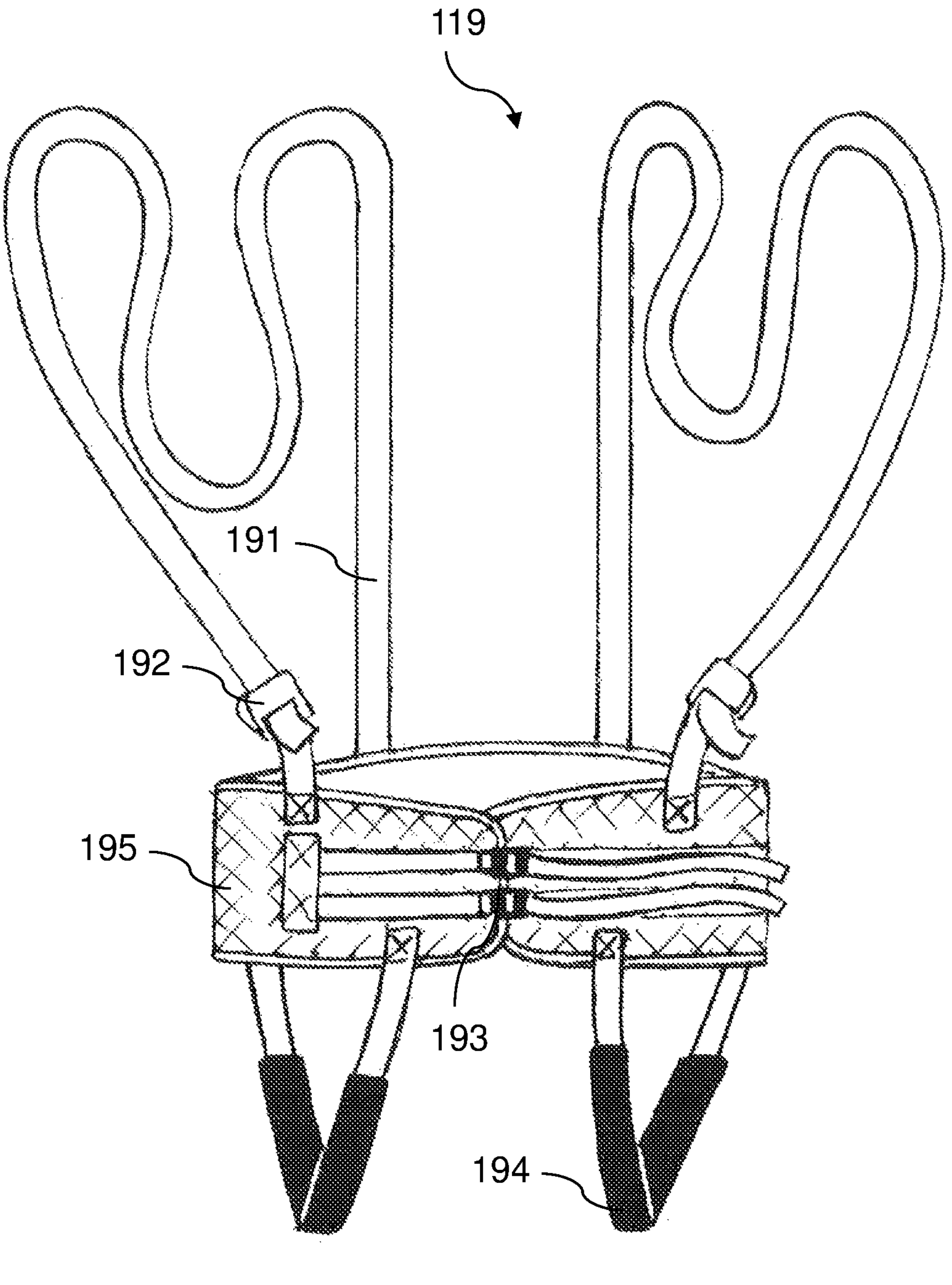
FIG. 26 represents, schematically and in a front view, a particular embodiment of a double-loop walking harness.

FIG. 25 illustrates a particular embodiment of a transfer harness 118 with two loops integral with this harness, which comprises two bilateral suspension slings that form two large loops, the left sling 120 is attached firstly to the left back portion 181 and secondly to the left leg portion 183 so as to form a first closed large loop. The right sling 120 is attached firstly to the right back portion 182 and secondly to the right leg portion 184 so as to form a second closed large loop. The small loops 186 make it possible to bring the two leg portions, left and right, closer to make the transfer operations safe. The harness 118 also comprises a head 185. In this particular configuration, one of the extremities of each of the suspension slings 120 is attached on either side, to the central portions and in the extension of the leg portions, i.e. 183 and 184.

According to one variant not shown, the transfer harnesses, 117 and 118, may comprise an abdominal belt that comprises a safety loop in order to obtain additional safety during seated/lying positions, this safety can be combined with the inclination sensor and travel controller further described below.

FIG. 26 illustrates a particular embodiment of a walking harness 119 with two removable and adjustable loops 191. The suspension slings 191 are connected to the abdominal support belt by buckles 192. The buckles 193 make it possible to adjust the tightness of the belt 195 on the abdominal portion of the person. The padded straps 194 between the legs have adjustment buckles at the back of the belt 195. The padded straps 194 between the legs, which form two closed loops, enable firm support of the person when the person is upright in the walking position.

Thanks to these provisions, this device allows a person to be lifted for physical therapy or ambulation, and the double-loop harness combined with the prehension device described above makes it possible to orient the person slightly forward or backward to respond to needs or a specific pathology. The action of a single lateral drive function of the motor can be envisaged.

Figure 27:
FIG. 27 represents, schematically and in a cross-section and perspective view, a particular embodiment of a sling of the double-loop harness.

FIG. 27 illustrates, in a cross-section and perspective view, a particular embodiment of a flat sling 420, this being proposed with a slightly notched rubber to increase the coefficient of friction with the lateral drive system of the prehension device.

Figure 28:
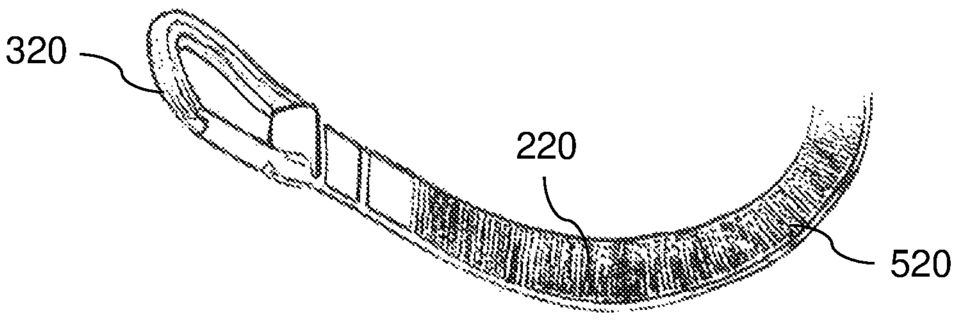
FIG. 28 represents, schematically and in a perspective view, a particular embodiment of a sling of the double-loop harness, this sling comprising a snap hook at its end.

FIG. 28 shows a particular embodiment of a removable flat sling 220 comprising a snap hook 320 configured to attach the sling to a back or leg portion of a double-loop harness. The sling 220 can be produced in polyester and comprise a rubber coating 520 to increase the coefficient of friction with the lateral drive system of the prehension system. Note that the snap hook 320 can be replaced by a clip.

Figure 29:
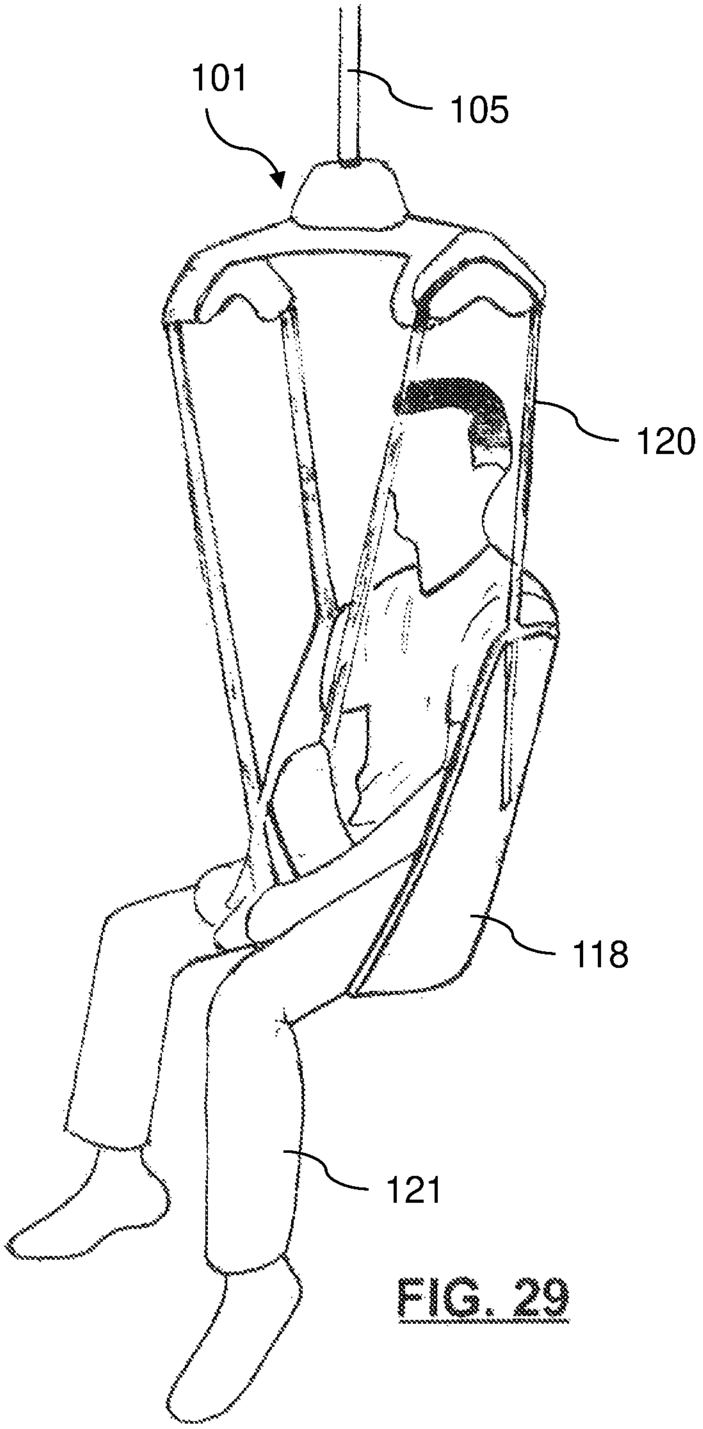
FIG. 29 represents, schematically and in a perspective view, a particular embodiment of the person transport device that is the subject of the invention, being used to transfer a person in a seated position by means of a ceiling rail.

FIG. 29 illustrates, in perspective, a particular embodiment of a person transport device comprising a harness 118 with no head, suspended by two double-loop slings 120 suspended from a motorised detachable prehension device, fixed to a ceiling rail. This illustration makes it possible to observe the route of the slings over the drive systems of the prehension device.

The prehension device can comprise at least one means of securing among the following means of securing, comprising respectively:

- an inclination sensor and a control means stopping the motors powering the motorised rollers when a predefined critical degree of tilt has been exceeded;
- a travel controller limiting the rotation travel of the rollers by predefined increments, actuated through successive sequences by the user; or
- a controller of the rotational speed of the rollers configured to limit the rotational speed, in particular during starts and stops to allow gradual starts and stops.

As a non-limiting example, a prehension device belonging to person transfer device according to the invention can measure an approximate length of fifty centimetres, corresponding to the space between the two devices driving the slings of the harness, and an approximate width of thirty centimetres, intended to drive harnesses through the effect of friction, with spacing included for variants with mobile supports.

The prehension device according to the invention can be combined with all types of harness-transfer harness with or without head, toilet and hygiene harness, amputee hammock, walking/ambulation harness, mesh harness for the bath, harness for roll-overs, harness for repositioning, or a stretcher for hospital transfers. A harness with head is recommended for a safe, comfortable lying position. With regard to the use of the harness for roll-overs, the prehension device, 101, 201, 301, 401 and 501, should be positioned perpendicular to the position of the bed of the person to be repositioned. In the configuration of the harness for roll-overs, the harness is comprised of a more or less flexible rectangular textile portion, which comprises two endless slings so as to form two large loops across the width, i.e. a first large loop in the vicinity of the legs of the person and a second large loop in the vicinity of this person's head.

As a non-limiting example, the double-loop harnesses can take a number of forms suitable for different uses and in several sizes, preferably at least four. The fabric of the double-loop harnesses can comprise a polyester fabric, which has the advantage of being flexible and resilient to more rigid textures. The fabric of the double-loop harnesses can comprise a parasilk fabric, which has the advantage of being flexible, thin, resilient and, above all, breathable, and is therefore especially suitable for the shell chair and can be left in place under the person. The fabric of the double-loop harnesses can have a mesh structure, which has the advantage of being especially suitable for the bath.

In the "passive transfer harness" configuration, corresponding in particular to the embodiments of FIGS. 24 and 25, the leg portions are preferably padded to increase their rigidity so as to avoid causing bruises by shear under the person's thighs. The double-loop harnesses can be completely padded for increased comfort.

The slings 120 and 220 are preferably produced in a resilient polyester textile and may, if necessary, comprise a coating to improve the coefficient of friction with the belt or with the rollers of the lateral drive systems. At least on one surface, the coating can be of the polyurethane coating type so as to have sufficient resilience to abrasion. Each of the two slings 120 and 220 is preferably configured to bear a cradle load of at least 250 kg and up to more than 500 kg for some large sizes and types of harness.

The slings 120 and 220 can be flat or round depending on the characteristics of the driving rollers, depending on whether they have a flat or round groove. In the configuration of the removable sling 220, it preferably comprises a reinforced loop or a clip at each of its extremities. The two slings that serve as a belt to tilt the harness into a desired position must be connected to the right and left back and leg portions of the harness and may be removable and comprise a snap hook or a quick-release safety clip, but must in all cases be integral with the harness for use of the device bearing it.

In some embodiments (not shown), the prehension device that is the subject of the invention comprises a means for sensory stimulation, visual animation, chromotherapy type, which makes it possible to diffuse therapeutic lights, musical animation or aromatherapy in order to transform the room of the person to be transported into a sensory space or to stimulate the person during the transport. These provisions make it possible to add a Snoezelen and fun element for transfers of children with multiple disabilities in medical and educational institutes (M.E.I.), and also in geriatrics for dependent elderly persons, in order to distract them and make transfers more agreeable.

For example, the prehension device can diffuse gentle lights such as those used in chromotherapy. According to other examples of implementation, the sensory stimulation means can diffuse a musical animation or odour (aromatherapy), or comprise a projector on top to project animations onto a nearby wall or a ceiling, of visual projection type. These options can be implemented separately or combined with each other.

The person transport device according to the invention is suitable for moving by translation suspended from a ceiling rail or from a mobile person-lift arm. The person transport device according to the invention allows the person transported to be tilted. In addition, it can allow a stretcher to be connected and slightly tilted for hospital transfers. The person transport device according to the invention is, however, not suitable for turning over rigid, voluminous loads.

The invention claimed is:

1. A person transfer device, that comprises:

a suspension from a ceiling rail, arm or lifting module;

a prehension device comprising a first lateral drive system comprising at least a first roller and a second roller, and a second lateral drive system comprising at least a first roller and a second roller;

a motor configured to rotate at least one of the first and second rollers of the first lateral drive and at least one of the first and second rollers of the second lateral drive, and a person transport harness comprising a first large sling loop supported by the first drive system, and a second large sling loop supported by the second drive system;

wherein said sling loops extend from a front portion of said harness to a rear a portion of said harness wherein said sling loops engage surface of said rollers such that rotation of said rollers causes displacement of said sling loops between said front portion and said rear portion, such that said harness is tilted according to at least two predefined positions.

2. The person transfer device according to claim 1, wherein the first and second lateral drive systems can be actuated simultaneously and independently.

3. The person transfer device according to claim 1, wherein each one of the first and second lateral drive systems includes a rotatable support and an actuator, wherein in each one of the first and second lateral drive systems said first roller and said second roller are mounted on said support, and wherein in each one of the first and second lateral drive systems said actuator is configured to vary the distance between said first roller and said second roller.

4. The person transfer device according to claim 1, which comprises a first support equipped with two rollers, referred to as the front support, and a second support equipped with two rollers, referred to as the rear support, and wherein the spacing distance between the rollers of the front support is smaller than the spacing distance between the rollers of the rear support, such that two axes, each traced between one roller of the front support and one roller of the rear support, are not parallel to each other and intersect in a V next to the front support.

5. The person transfer device according to claim 1, wherein a first roller is mounted on a first support, referred to as the front support, mobile in translation along a slot relative to a second roller mounted on a second support, referred to as the rear support, the first and second rollers belonging to the same lateral drive system.

6. The person transfer device according to claim 1, wherein the motor is configured to rotate at least two rollers of said first and second lateral drive systems.

7. The person transfer device according to claim 1, wherein at least one lateral drive system comprises a driving belt connected to at least one first roller, referred to as a driver roller, coupled to said motor, and to at least one second roller, referred to as a driven roller, driven by the driving belt, the large sling loops being supported by the driving belt.

8. The person transfer device according to claim 7, which comprises at least one sling carrier, and wherein the carrier comprises a latch movable between an open position and a closed position to maintain the slings in position on the driving belt or on the rollers, such that these slings can only be detached when the movable latch is in the open position.

9. The person transfer device according to claim 7, which comprises a strap and a motorised winder configured to raise or lower the person transfer device as a function of the winding of the driving belt, which acts as a suspension shaft connected to a ceiling rail or other overhead support.

10. The person transfer device according to claim 7, wherein the coefficient of friction between at least one sling and a roller or between at least one sling and the driving belt is at least greater than 0.4.

11. The person transfer device according to claim 1, which comprises at least one sensory stimulator, chosen from amongst a loudspeaker, a projector and an odour diffuser, making it possible to utilise therapeutic animations of chromotherapy, lighting effects, visual projections, sound effects or aromatherapy type.

* * * * *